United States Patent
Croxford et al.

(10) Patent No.: US 10,649,795 B2
(45) Date of Patent: May 12, 2020

(54) METHOD OF AND APPARATUS FOR PROVIDING AN OUTPUT SURFACE IN A DATA PROCESSING SYSTEM

(71) Applicant: ARM Limited, Cambridge (GB)

(72) Inventors: Daren Croxford, Cambridge (GB); Piotr Tadeusz Chrobak, Cambridge (GB); Damian Piotr Modrzyk, Cambridge (GB)

(73) Assignee: Arm Limited, Cambridge (GB)

(*) Notice: Subject to any disclaimer, the term of this patent is extended or adjusted under 35 U.S.C. 154(b) by 30 days.

(21) Appl. No.: 15/531,981

(22) PCT Filed: Nov. 30, 2015

(86) PCT No.: PCT/GB2015/053652
§ 371 (c)(1),
(2) Date: May 31, 2017

(87) PCT Pub. No.: WO2016/087831
PCT Pub. Date: Jun. 9, 2016

(65) Prior Publication Data
US 2017/0329613 A1 Nov. 16, 2017

(30) Foreign Application Priority Data
Dec. 1, 2014 (GB) .................................. 1421301.1

(51) Int. Cl.
*G06F 9/44* (2018.01)
*G09G 5/377* (2006.01)
(Continued)

(52) U.S. Cl.
CPC ............ *G06F 9/451* (2018.02); *G09G 5/377* (2013.01); *G09G 5/14* (2013.01); *G09G 2340/02* (2013.01);
(Continued)

(58) Field of Classification Search
CPC ................ G09G 5/14; G09G 2340/10; G09G 2340/125; G06T 11/60; H04N 5/44504
See application file for complete search history.

(56) References Cited

U.S. PATENT DOCUMENTS 5,977,973 A 11/1999 Sobeski
9,177,401 B2 * 11/2015 Campbell ............... G06T 11/60
(Continued)

FOREIGN PATENT DOCUMENTS

EP    2597565      5/2013
WO    WO 00/68887  11/2000

OTHER PUBLICATIONS

GB Search Report dated Jun. 1, 2015, GB Patent Application GB1421301.1.
PCT International Search Report dated Feb. 4, 2016, PCT Patent Application No. PCT/GB2015/053652.
(Continued)

*Primary Examiner* — Todd Buttram
(74) *Attorney, Agent, or Firm* — Vierra Magen Marcus LLP

(57) ABSTRACT

An apparatus for compositing an output surface (10) from a plurality of input surfaces (1, 2, 3, 4) includes processing circuitry and a composition processor. The processing circuitry is configured to determine whether two or more input surfaces of the plurality of input surfaces (1, 2, 3, 4) can be combined into a single secondary surface for provision to the composition processor. When it is determined that two or more input surfaces of the plurality of input surfaces (1, 2, 3, 4) can be combined into a single secondary surface for provision to the composition processor, the processing circuitry is configured to provide data representing the secondary surface to the composition processor, the data indicating the input surfaces that contribute to the secondary surface.

17 Claims, 18 Drawing Sheets

(51) Int. Cl.
*G06F 9/451* (2018.01)
*G09G 5/14* (2006.01)

(52) U.S. Cl.
CPC ... *G09G 2360/08* (2013.01); *G09G 2360/121* (2013.01)

(56) References Cited

U.S. PATENT DOCUMENTS

| | | | |
|---|---|---|---|
| 2005/0168471 A1 | 8/2005 | Paquette | |
| 2009/0064035 A1 | 3/2009 | Shibata | |
| 2010/0058229 A1* | 3/2010 | Mercer | G06F 9/451 715/788 |
| 2012/0183191 A1* | 7/2012 | Nakamura | A61B 5/416 382/128 |
| 2012/0268480 A1 | 10/2012 | Cooksey | |
| 2018/0322679 A1* | 11/2018 | Kunkel | H04N 5/2723 |

OTHER PUBLICATIONS

PCT Written Opinion of the International Searching Authority dated Feb. 4, 2016, PCT Patent Application No. PCT/GB2015/053652.
Amiga® Hardware Reference Manual, 3rd edition, ISBN 0-201-56776-8 (http://amigadev.elowar.com/read/ADCD_2.1/Hardware_Manual_guide/node0048.html).
Wikipedia article, "Raster image processor": http://en.wikipedia.org/wiki/Raster_image_processor.
Fisher, "Scan line array processors for image computation", ISCA '86 Proceedings of the 13th annual international symposium on Computer architecture, vol. 14, issue 2, pp. 338-345, May 1986 (we are currently obtaining a copy of this document).
Wikipedia article, "Scanline rendering": http://en.wikipedia.org/wiki/Scanline_rendering.
Denault et al, "VLSI Drawing Processor Utilizing Multiple Parallel Scan-Line Processors", EGGH87: Eurographics Workshop on Graphics Hardware 1987, ISBN 3-540-50109-6.

* cited by examiner

METHOD OF AND APPARATUS FOR PROVIDING AN OUTPUT SURFACE IN A DATA PROCESSING SYSTEM

BACKGROUND

The technology described herein relates to a method of and a system for providing an output surface (such as a frame to be displayed) in a data processing system, and in particular to providing an output surface that is composited (generated) from one or more input surfaces (such as input windows) in a data processing system.

Many electronic devices and systems use windows for displaying information, such as a graphical user interface, game, demo, etc., to a user on a display screen (and for allowing a user to interact with an application or applications being executed).

A common way of providing such windows is to use a compositing window system, in which individual input windows are combined appropriately (i.e. composited), e.g. by a composition engine, and the result is written out to a frame buffer, which is then read by a display controller for the display in question in order to display the windows to the user. Since such systems write out to a frame buffer and this buffer is then read for display, they are often referred to as frame buffer composition systems.

As well as such frame buffer composition systems, there also exist direct composition systems, in which a composited frame is generated from input surfaces (windows) and then output to a display directly (i.e. not via intermediate storage in a frame buffer), e.g. by a compositing display controller.

In such composition systems, a number of hardware resources, including dedicated registers that store, e.g. a pointer to the frame buffer in memory, frame buffer size, crop and format information, and a dedicated input FIFO, are typically provided for each input surface that the composition system can composite into an output surface. As these hardware resources required for each input surface are fairly substantial, most composition engines or compositing display controllers only support a limited number of input surfaces, such as between three and eight input surfaces.

However, there is generally no upper bound on the number of input surfaces that could be required to be composited. In the case where the number of input surfaces to be composited exceeds the number of input surfaces that the hardware resources of the composition system can support, then it is possible to offload some of the composition operation to a separate processor, such as a graphics processing unit (GPU) or a CPU, but this is not always possible or ideally desirable.

The Applicant believes therefore that there remains scope for improvements to composition systems.

BRIEF DESCRIPTION OF THE DRAWINGS

Embodiments of the technology described herein will now be described, by way of example only, with reference to the accompanying drawings, in which.

Like reference numerals are used for like features throughout the drawings where appropriate.

DETAILED DESCRIPTION

Figure 1:
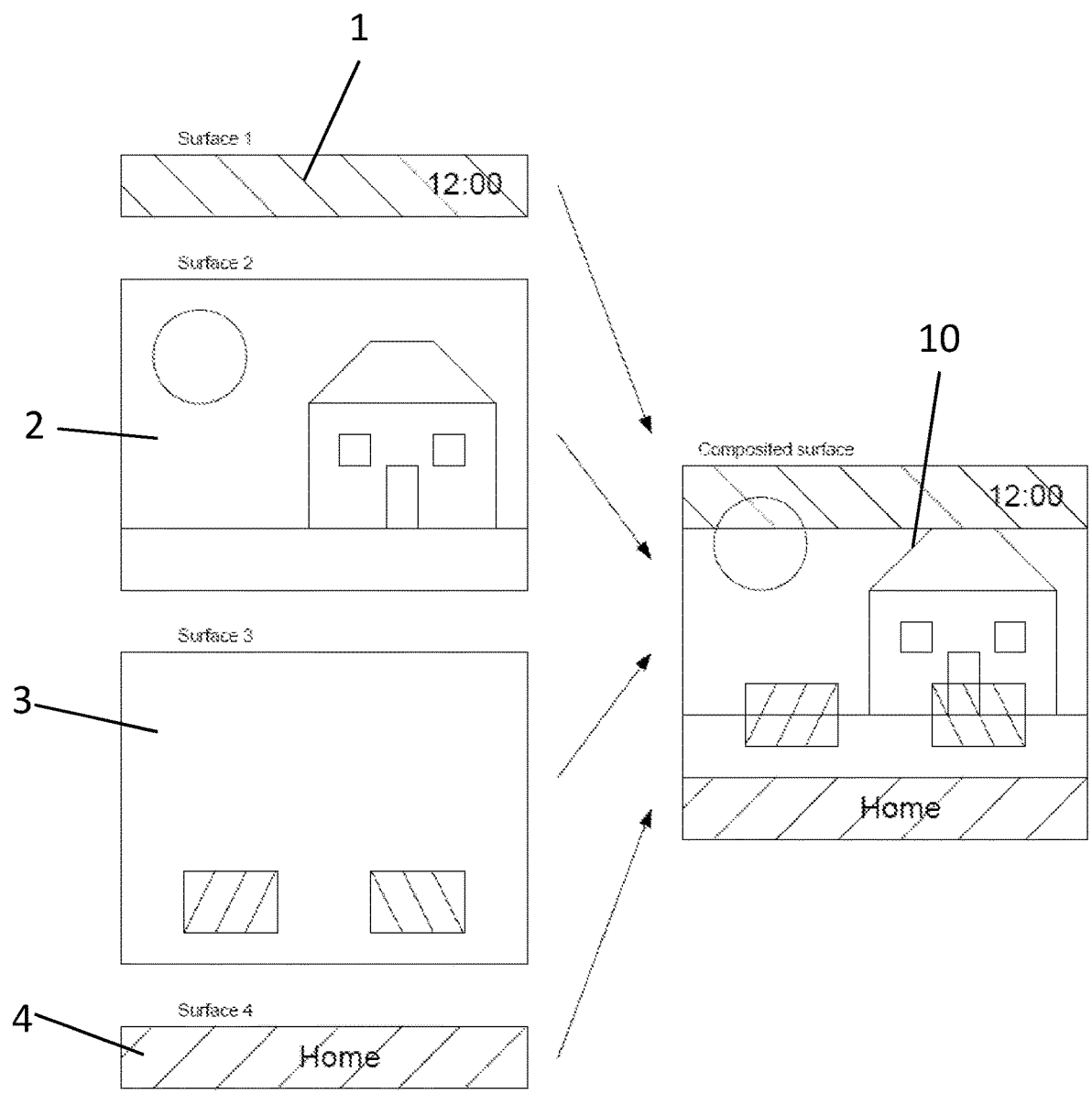
FIG. 1 is an example of an output surface composited from multiple input surfaces in accordance with the described embodiments of the technology described herein.

An embodiment of the technology described herein comprises a method comprising:

when an output surface is to be composited from a plurality of input surfaces by a composition processor:
  determining whether two or more input surfaces of the plurality of input surfaces can be combined into a single secondary surface for provision to the composition processor; and
  when it is determined that two or more input surfaces of the plurality of input surfaces can be combined into a single secondary surface for provision to the composition processor:
  providing data representing the secondary surface to the composition processor, the data indicating the input surfaces that contribute to the secondary surface.

Another embodiment of the technology described herein comprises an apparatus comprising processing circuitry configured to:

when an output surface is to be composited from a plurality of input surfaces by a composition processor:
  determine whether two or more input surfaces of the plurality of input surfaces can be combined into a single secondary surface for provision to the composition processor; and
  when it is determined that two or more input surfaces of the plurality of input surfaces can be combined into a single secondary surface for provision to the composition processor:

provide data representing the secondary surface to the composition processor, the data indicating the input surfaces that contribute to the secondary surface.

The technology described herein relates to a composition system in which multiple input surfaces are to be composited (combined) using a composition processor (such as a compositing display controller or composition engine), to provide an output surface (that can, for example, then be displayed and/or written out to a memory, e.g. for display). However, in the technology described herein rather than simply providing all the input surfaces directly to the composition process, two or more of the input surfaces are first, in effect, combined into a single, secondary (intermediate) surface, and that secondary surface is then used when compositing the output surface.

As will be discussed further below, by identifying and combining plural input surfaces into a secondary surface, the secondary surface can then be provided as a single surface, equivalent to any other input surface, to the composition process. This can then allow more input surfaces to, in effect, be composited to provide an output surface, but without the need to provide explicit hardware support (e.g. FIFO buffers) for each input surface individually, or to composite some or all of the input surfaces using another processor, such as a GPU.

Thus a larger number of input surfaces can be accommodated in an e.g., composition engine or compositing display controller, without a significant increase in the hardware resources required, because the composition process can handle the secondary surface as a single surface when it is being composited to form the output surface.

The input surfaces and the output surface in the technology described herein may be any suitable and desired such surfaces. As will be appreciated from the above, in one embodiment the technology described herein is used in a compositing window system, and so the input surfaces are input windows (to be displayed), and the output surface is an output frame (composited window) for display. In a compositing window system, the input surface windows may be, e.g., for a game, a demo, a graphical user interface (GUI), a GUI with video data (e.g. a video frame with graphics "play back" and "pause" icons), etc.

However, other arrangements would be possible. For example, the output surface could be some intermediate window that is then itself to be composed with other windows into a final output window (frame), or the output surface could, e.g. be some form of data structure, such as a graphics texture, that is intended to be used in further, e.g., graphics, processing.

In an embodiment, the input and output surfaces are all images, e.g. frames for display.

The input surfaces may have the same or different sizes, and the output surface may be the same size as or a different size to the input surface(s).

The input surfaces can be generated as desired, for example by being appropriately rendered by a surface (frame) generator, such as a graphics processing system (a graphics processor), a video processor, a CPU, etc.

In an embodiment the generated input surfaces are stored in appropriate memory, e.g. in respective frame buffers in main memory, from where they can be retrieved for use. In an embodiment, data indicating the location of the input surface data is also generated and stored.

The determination of whether any of the input surfaces to be composited to form the output surface can be used to form a secondary surface can be performed in any suitable and desired way. In an embodiment the determination also determines which input surfaces (if any) to use for the secondary surface (e.g. as part of the same determination process).

In one embodiment determining whether and which input surfaces can be combined in a secondary surface comprises determining whether any of the input surfaces from the plurality of input surfaces do not overlap each other (and, e.g., any of the other input surfaces from the plurality of input surfaces), and then using two or more of the determined non-overlapping input surfaces (if any) to form the secondary surface. Thus, in an embodiment, the secondary surface is formed from two or more non-overlapping input surfaces.

The Applicants have recognised that non-overlapping input surfaces (however chosen) are more straightforward to combine into a secondary surface, because no consideration then needs to be given as to the size or position of the input surfaces, i.e. which part of an input surface is visible bearing in mind the other input surfaces, e.g. owing to overlapping input surfaces, or to the transparency (i.e. the alpha values) of the input surfaces.

In these arrangements, the secondary surface could be formed only from input surfaces of the plurality of input surfaces that do not overlap any of the other input surfaces in the plurality of input surfaces. Alternatively, the secondary surface could be formed from a subset of input surfaces that do not in themselves overlap each other (i.e. that do not overlap any of the other input surfaces in the subset of input surfaces that form the secondary surface), but with input surfaces within the subset of input surfaces then (potentially) overlapping other input surfaces that are not included in the subset of input surfaces that is used to form the secondary surface.

Thus in this case, the secondary surface will be formed from a set of input surfaces that do not overlap each other at all, but there may be other input surfaces in the overall plurality of input surfaces that are to be composited that overlap with one or more of the input surfaces in the subset of input surfaces that is being used for the secondary surface.

In an embodiment, particularly where the secondary surface is formed from input surfaces that could or do overlap with other input surfaces in the plurality of input surfaces that are not included in the secondary surface, it is checked whether the input surfaces that are used for the secondary surface do not have any intermediate (in terms of depth) overlapping non (completely) transparent input surfaces between them (between any two of the input surfaces used for the secondary surface), and only input surfaces that do not have any intermediate (in terms of depth) overlapping non (completely) transparent input surfaces between them are used to form the secondary surface.

The secondary surface could be formed only from non-overlapping, input surfaces, and in this case, the whole of each input surface may be included in the secondary surface.

However, the Applicants have further recognised that it would also or instead be possible to combine overlapping input surfaces into a single secondary surface, and so in an embodiment, this is what is done. In this case, the secondary surface may comprise only a portion or portions (but not all of) at least one of the input surfaces in question.

Where overlapping input surfaces are being considered for inclusion in a secondary surface, then in an embodiment, a pair of overlapping input surfaces are only included in a secondary surface when the foremost surface (in screen space) (where the surfaces overlap) is (completely) opaque.

Thus, in an embodiment determining whether and which input surfaces can be combined in a secondary surface comprises determining for input surfaces of the plurality of input surfaces that at least partly overlap, whether the foremost input surface in screen space of the determined overlapping input surfaces is opaque where the surfaces overlap, and, in an embodiment, if so, then including the determined overlapping input surfaces in the secondary surface.

In one embodiment, the secondary surface is formed only from opaque input surfaces, but this is not essential, and it could include one or more non-opaque input surfaces (e.g. that do not overlap and/or that lie behind other input surfaces in the secondary surface), if desired. The secondary surface may as a whole or in part be non-opaque (translucent) to surfaces that lie behind it.

In an embodiment, the input surfaces are considered in depth order in screen space, e.g., starting from the foremost input surface in screen space. Thus, in an embodiment, the plurality of input surfaces are first ordered by increasing depth in screen space.

Thus, in an embodiment, when determining whether and which input surfaces to include in a secondary surface, the first pair of input surfaces in order of their depth in screen space are considered first (e.g. to see if they overlap at all), and then the next input surface in the depth order is considered (e.g. to see if it does not overlap any input surfaces already selected to form the secondary surface), and so on, until a set of input surfaces to form the secondary surface is determined.

Considering the input surfaces in depth order, e.g. to determine whether there is any overlap of a given input surface with the already selected input surfaces, is a particularly convenient way of determining which input surfaces may be used to form a secondary surface.

In an embodiment, an operating system or application, for example, can also or instead specify an input surface or surfaces that is to be included in a secondary surface, i.e. input surfaces can be predetermined to be included in a secondary surface by, e.g., a processor or application external to the operation of the technology described herein.

In an embodiment, before determining which input surfaces to use to form a secondary surface, any input surfaces that are completely transparent are discarded. As will be appreciated there is no point in processing these transparent surfaces because they will not contribute to the output surface.

Similarly, in an embodiment any input surfaces that are completely covered by opaque regions of other input surfaces (or by completely opaque other input surfaces) are discarded before determining which input surfaces to use to form a secondary surface. As will be appreciated there is no point in processing such input surfaces because they will not contribute to the output surface.

As will be appreciated, the ordering of the input surfaces, e.g. by depth in screen space, is particularly useful, along with the size and position of the plurality of input surfaces in screen space, for determining which input surfaces to use to form a secondary surface. Thus in an embodiment one or more attributes of the plurality of input surfaces, e.g. one or more (and, e.g., all) of: the ordering of the input surfaces, the size of each input surface, the position of each input surface and the transparency of each input surface, is used to determine whether any of the input surfaces can be combined to form a secondary surface, and/or which of the input surfaces should be combined to form a secondary surface.

The attributes of the plurality of input surfaces may be supplied in any suitable and desired way. In one embodiment a processor, e.g. the GPU or CPU running an operating system, is configured to supply one or more attributes of the plurality of input surfaces to the secondary surface determination process.

All of the input surfaces in the plurality of input surfaces may be combined in a single secondary surface, i.e. the determination of which input surfaces to use to form the secondary surface may result in all of the input surfaces being chosen. However, in an embodiment, a secondary surface is generated from a sub-set of the input surfaces in the plurality of input surfaces. Thus, in an embodiment, the secondary surface is an "intermediate" surface in the processing of the output surface, which is then composited with other input surfaces, and/or secondary surfaces generated in the manner of the technology described herein, to form the composited output surface.

It will also be appreciated that there may be more than one combination of input surfaces which satisfies the criteria for forming a secondary surface, e.g. a set of input surfaces which do not overlap. In this case, only one secondary surface could be formed, but in an embodiment, two or more secondary surfaces, e.g., each made up of different sub-sets of the input surfaces, are formed.

Thus, in an embodiment, there are two or more secondary surfaces that are then composited with each other and any remaining input surfaces to provide the composited output surface.

Once the input surfaces that are to be combined into a secondary surface for provision to the composition processor have been determined, then data representing the secondary surface is provided to the composition processor.

The data can be provided to the composition processor in any suitable and desired way. In an embodiment, it is stored in (written to) suitable memory of or accessible to the composition processor, e.g. in a local memory or memories of or accessible to the composition processor. Thus, the data representing a secondary surface may, for example, be written into a set of registers that are associated with the composition processor (and in one embodiment this is what is done), and/or it could be written into a suitable cache memory of or associated with the composition processor.

The process of providing data representing a secondary surface to the composition processor could simply comprise providing data that already exists about the input surfaces to the composition processor (e.g. by storing that data in registers associated with the composition processor), or it could, if desired, comprise deriving new data (and new data structures) to indicate the input surfaces that contribute to the secondary surface. Thus, in an embodiment, the technology described herein comprises generating data representing the secondary surface, which data indicates the input surfaces that contribute to the secondary surface, and then providing that data to the composition processor, e.g. by storing it in suitable storage (memory) associated with or accessible to the composition processor.

The data representing a secondary surface that indicates the input surfaces that contribute to the secondary surface and that is provided to the composition processor can take any desired and suitable form.

It could, for example, simply indicate the input surfaces that are to contribute to the secondary surface (e.g., without otherwise indicating how those input surfaces are arranged within the secondary surface). Thus, in one embodiment it comprises an identification of the input surfaces that contribute to the secondary surface, e.g. a list of the determined input surfaces. This may be appropriate where, for example, the secondary surface is formed of completely non-overlapping input surfaces, as in that case simply an indication of which input surfaces contribute to the secondary surface may be enough to allow the composition processor to determine which input surface to use at any given position within the secondary surface.

In an embodiment of this arrangement (and, e.g., otherwise), the input surfaces that are to be used to form the secondary surface are arranged in and indicated to the composition processor in a particular, e.g. selected, order. In an embodiment, the input surfaces that are to form the secondary surface are sorted (ordered) based on their horizontal position coordinates (their x coordinates) (e.g. of their left-hand edges). In an embodiment the input surfaces in the secondary surface are sorted by the x coordinate of their left edge. This then facilitates the composition process/processor simply working through the input surfaces that are to form the secondary surface from left to right for each horizontal line of the secondary surface to determine which input surface to use for each respective position within the secondary surface (for example in arrangements where the input surfaces that are to form the secondary surface do not overlap each other within the secondary surface).

In an embodiment, the data indicating the input surfaces that contribute to a secondary surface that is provided to the composition processor comprises data indicating where the data for the input surface in question is stored. This data may take any desired and suitable form, but in an embodiment comprises one or more of, and, e.g., all of: a pointer to where the data for the input surface is stored in memory, and an indication of the size of the input surface in memory. This may be all the data that is needed to be provided to the composition processor in the situation where the input surfaces that contribute to the secondary surface are simply identified, e.g. where the secondary surface is formed from non-overlapping input surfaces only.

In an embodiment, the data representing the secondary surface that is provided to the composition processor indicates, at least to a limited extent, how the input surfaces are arranged in the secondary surface. This may be particularly appropriate where the secondary surface includes overlapping input surfaces, and will, for example, help to reduce or avoid the need for the composition processor itself to determine which input surface is present at any given position within the secondary surface.

Thus, in an embodiment the data representing a secondary surface identifies, for each of two or more regions of the secondary surface, the input surface that is to form the region of the secondary surface.

Thus, in an embodiment, the step of providing data representing a secondary surface to the composition processor comprises (and the processing circuitry is configured to):
  determining, for each of two or more regions of the secondary surface, which of the two or more of the plurality of input surfaces is to form the region of the secondary surface; and
  providing to the composition processor for each of the two or more regions of the secondary surface, data identifying the input surface that is to form the region of the secondary surface.

In these embodiments, accordingly, for each of the two or more regions of the secondary surface, a data structure comprising information identifying the input surface that is to form the region of the secondary surface is, e.g., written to storage of or accessible to the composition processor.

In these embodiments of the technology described herein, the arrangement of the input surfaces within the secondary surface is indicated on the basis of the secondary surface having multiple regions, each corresponding to an area of the secondary surface which is formed by an input surface.

Indicating the arrangement of the input surfaces that contribute to a secondary surface on a per region basis facilitates having a more complex arrangement of input surfaces contributing to the secondary surface, such as input surfaces that overlap with each other, and/or input surfaces that have irregular shapes.

The input surfaces that are to form the secondary surface at the two or more regions can be determined in any suitable and desired way. For example, the foremost input surface for each of the regions could be determined and thus indicated for that region in the data structure. In an embodiment, however, the input surfaces to be used to form the secondary surface are first determined by applying one or more of the above-described criteria which are applicable for the input surfaces as a whole, e.g. their overlap, transparency, opacity, ordering, etc.

Thus a number of input surfaces are pre-selected which are suitable for forming the secondary surface, and then the input surface to use to form the secondary surface at each of the two or more regions is determined, e.g. by determining the foremost input surface from the set of pre-selected input surfaces for each of the regions.

In an arrangement of these embodiments, the input surface that is to form each region of the secondary surface is determined on a line by line basis, i.e. the regions of the secondary surface comprise one or more groups of one or more lines traversing the secondary surface.

By determining the arrangement of the input surfaces on a line by line (or a group of lines) basis, the composition processor does not need to determine itself the arrangement of the input surfaces across the whole of the secondary surface, e.g. their size and position.

The width of each line, i.e. in a direction perpendicular to the length of the line traversing the secondary surface, could take any value as is suitable and desired. In an embodiment the width of each line is one point, e.g. sampling point, (as stored in the memory), however this could be scaled for the final display.

The lines traversing the secondary surface can be defined in any suitable any desired way. In an embodiment the lines are straight and, e.g., the lines traverse the secondary surface horizontally. However, the secondary surface (and the frame comprising the secondary surface) may be rotated, after it has been composited, for display. In an embodiment the lines traverse the entire (width of) the secondary surface (but this is not essential). Thus, in an embodiment, the lines are processed (both for determining the data representing the secondary surface and for compositing the secondary surface) vertically, starting with the uppermost line, with each horizontal line being considered from left to right.

In these embodiments of the technology described herein, the arrangement of the input surfaces within the secondary surface is determined on a line by line (or a group of lines) basis. In an embodiment this is achieved by dividing the line (or group of lines) into segments (which are, e.g., defined in a direction parallel to the length direction of the lines) and determining, for each point or group of points (a segment), along the line (or group of lines), which of the input surfaces is to be used to form the secondary surface. Thus, in an embodiment, the one or more lines of a group of lines comprise one or more segments of one or more points.

Thus, in an embodiment, the process of generating the secondary surface comprises (and the processing circuitry, to generate the secondary surface, is configured to):

determining, for each of one or more groups of one or more lines traversing the secondary surface, the one or more lines of the group comprising one or more segments of one or more points, which input surface is to form the secondary surface at each point along the one or more lines of the group; and the method further comprises (and the processing circuitry is configured to):

provide to the composition processor, for each group of one or more lines, (e.g. a data structure comprising) information identifying the input surface that is to form the secondary surface at each segment of the one or more lines of the group.

In the embodiment in which the input surfaces to use to form the secondary surface are determined on a line by line basis, i.e. for each "line segment", the points can represent any type of point as is desired and suitable. For example, the points could correspond directly to the pixels of the display on which the secondary surface is to be (potentially) displayed or the points for which the data is stored for the input surfaces. However, in an embodiment, the points correspond to the sampling points used when compositing the secondary surface, which may then be scaled to the final display.

In these embodiments, each group of lines could simply consist of a single line traversing the secondary surface, with the input surfaces used to form the secondary surface at each point of the line being determined and written out to the storage medium for each line individually. However the Applicants have appreciated that because the same arrangement of input surfaces along a certain line will often be repeated for multiple consecutive lines, particularly when the input surfaces are rectangular (as will be seen from the arrangement of the input surfaces in FIG. 1), it is beneficial to group these lines together.

Therefore, in an embodiment, each group of lines can contain one or more consecutive lines (e.g. in a direction orthogonal to the length direction of the lines) which have the same arrangement of input surfaces used to form the secondary surface at each segment along the line. Correspondingly, in an embodiment there is at least one group of lines that contains a plurality of consecutive lines which have the same arrangement of input surfaces used to form the secondary surface at each segment along the line.

Thus, in an embodiment, the method comprises the step of determining (and correspondingly the processing circuitry is configured to determine), for a line, whether or not the arrangement of input surfaces used to form the secondary surface at each segment of the line is the same as the previous line. Once it is determined that a line is the same as the previous line, the same information identifying the determined input surface that is used to form the secondary surface at each segment of the line may be provided to the composition processor.

However the Applicants have appreciated that the information needed can be reduced when, for repeated lines, the information identifying the determined input surface that is used to form the secondary surface at each segment of the plurality of lines is only stored once and then the number of lines in the group of repeated lines is specified, e.g. using Run Length Encoding. Thus, in an embodiment the method comprises the step of determining (and correspondingly the processing circuitry is configured to determine), for a group of a plurality of consecutive repeated lines, how many lines are in the group, and then providing information representative of the number of lines, along with the information identifying the determined input surface that is used to form the secondary surface at each segment of the plurality of lines, to the composition processor.

The information identifying the determined input surface that is used to form the secondary surface at each segment of a group of lines can be specified in any suitable and desired way. The information could be specified at each individual point along the line, i.e. each segment could simply consist of a single point (e.g. sampling point).

However, in a similar manner as for the groups of lines, where an advantage was taken from having groups of repeated lines in order to reduce the size of the information, the Applicants have appreciated that because often the same input surface will be repeated for a plurality of points (e.g. sampling points) along a segment, i.e. a segment will comprise a plurality of points (e.g. sampling points), because the region of an input surface used to form the secondary surface will generally have an area of greater than a single point, it is beneficial to specify the input surface used to form the secondary surface for all of a segment, i.e. rather than for each point individually. It will be appreciated that this can result in a significant reduction in the amount of storage space required to store the data structure, as well as the amount of processing required to determine the input surface for each segment (e.g. as opposed to each point), thus reducing the latency of the process and the power consumed.

Therefore, in an embodiment, a segment comprises one or more consecutive points (e.g. sampling points or pixels) for which the same input surface is used to form the secondary surface along a line, and the method comprises the step of determining (and correspondingly the processing circuitry is configured to determine), for each segment of the one or more lines, how many points the segment comprises. Once this information has been determined, in an embodiment, the method also comprises the step of providing (and correspondingly the processing circuitry is configured to provide) to the composition processor, for each segment of the one or more lines, the information identifying the determined input surface that is used to form the secondary surface for the segment and the length of the segment, e.g. the number of points (e.g. sampling points or pixels). This can be done using Run Length Encoding to encode how many points in each segment are taken from a given input surface.

The data identifying the determined input surface that is to be used for the secondary surface at each region or segment (of the lines) of the secondary surface, can be stored in any desired and suitable way, including using Run Length Encoding as has been outlined above. In one embodiment the information comprises one or more tags identifying the input surface which is to be displayed for the respective region or segment, e.g. which can then be used to look up the data to be displayed for the respective input surfaces. However, in an embodiment, the information comprises one or more pointers, i.e. that point to the data to be displayed for the respective input surfaces and thus which are followed when the information is read by the composition processor.

In these embodiments, the data for the segments in the lines of the secondary surface, whether as tags or pointers, for example, could all be indicated in a single data entry, e.g. on a per line basis. However, in an embodiment, the data is organised such that the information identifying the input surface that is used to form the secondary surface at each segment of a group of one or more lines comprises a first data entry comprising a pointer (or other identifier) for the group of one or more lines that points to a set of second data entries for the group of one or more lines, within each second data entry then comprising information identifying the input surface that is to be used for the secondary surface at a respective segment of the group of lines.

Thus, in an embodiment, there is a set of first data entries (a "header"), which contains, e.g. pointers, for the group of lines in the secondary surface, that provides an overall data structure for the whole of the secondary surface, with a first data entry provided for each group of lines. The, e.g. pointers, from the first data entries, then point to respective sets of second data entries, one for each group of lines, which then detail how each group of lines is arranged, i.e. which input surface is to be displayed for which segment of the lines in the group of lines.

Thus each set of second data entries provides a data structure for a respective group of lines, and details how each group of lines is arranged into segments. A second data entry is provided for each segment along a (group of) line(s) and identifies the input surface to be displayed for the segment.

As before, in an embodiment, the lines are grouped together, e.g. for repeated lines. Thus similarly, the set of second data entries for a given group of lines could be written out separately for each line in the group of lines, but, in an embodiment, the set of second data entries is written out only once for a group of lines. There could be a separate first data entry for each line of the plurality of lines in a given group (comprising e.g. a pointer to the set of second data entries for the group), but, in an embodiment, a single pointer (first data entry to the set of second data entries) is written for the first line in a group of lines along with information representative of the number of lines in the group, i.e. how many times to repeat the line and thus how many times to follow the initial pointer to provide the necessary repeats. Therefore in an embodiment the set of first data entries comprises a pointer (to a set of second data entries) for each group of lines and information representative of the number of lines in each group.

Also similarly, the second data entry could comprise tags and pointers for each point in a segment, e.g. identifying the data for which input surface to display for the secondary surface. However, as discussed previously, in an embodiment the second data entry comprises information identifying the input surface that is used to form the secondary surface for the segment of the group of lines and information representative of the length of the segment. Thus in an embodiment each set of second data entries comprises information identifying the input surface that is used to form the secondary surface for each segment of the group of lines and information representative of the length of each segment.

In an embodiment, the information identifying the determined input surface for a particular line segment, e.g. stored in the second data entry, is generated as each new line segment is reached. This reduces the amount of persistent data stored in the system, thus reducing the number of registers required.

In an embodiment a (and each) second data entry comprises a pointer pointing to (stored) data that indicates where the input surface that is to be used to form the secondary surface for the region of the secondary surface in question is stored. Thus, in an embodiment, the second data entries point to a set of third data entries, with each third data entry indicating where the data for a respective input surface is stored. In an embodiment, these third data entries have the form discussed above, i.e. comprise one or more of: a pointer to where the data for the input surface in question is stored in memory, and an indication of the size of the input surface in memory.

As set out for the above embodiments, in an embodiment, a secondary surface will therefore be defined by a set of first data entries and corresponding sets of second and third data entries which are conveniently provided as a data structure in a storage medium. In some embodiments the data structure may also comprise further information, e.g. one or more of: input frame buffer format information, rotation information, scaling information, etc.

While in some embodiments a secondary surface is completely filled with input surfaces, and thus either opaque or translucent to everything behind it, i.e. each line of the secondary surface is completely filled with segments for which an input surface is displayed, in other embodiments a secondary surface comprises areas which are not covered by any input surfaces. Thus, for example, each group of lines may include parts, i.e. segments, for which no input surface is defined (used to form the secondary surface).

In an embodiment, when a group of lines includes a part for which no input surface is present, then a line segment is defined for that part (or parts) of the line(s) as well. Thus, in an embodiment, the data identifying the input surfaces that are used to form the secondary surface also indicates any regions of the secondary surface (e.g. the segments) where no input surface is in fact present. Such regions could, e.g. be flagged appropriately, e.g. by data, such as a null code, indicating that.

The regions of a secondary surface that are not covered by an input surface can be treated in any desired and suitable way. For example, such regions could be defined as having a default colour (with an appropriate alpha value) or be defined as being transparent. Thus when the data identifying the input surfaces used to form the secondary surface is read, by the controller, and a region with no input surface is encountered, e.g. identified by the use of a null code, the composition process/processor is able to treat those segments appropriately, e.g. by using a default colour for the region or simply treating it as being transparent.

A secondary surface may be opaque, or a secondary surface as a whole may have a translucency. In the latter case the translucency of the secondary surface may be determined once all the input surfaces for the secondary surface have been determined. The translucency of the secondary surface may be defined for the surface as a whole (this could be defined as a function such that the alpha value varies across the surface) or the alpha values could be defined individually for each region, group of line(s), segment, and/or point across the secondary surface.

A secondary surface could cover the entire output surface, e.g. fill the whole screen containing the display frame. However, in one embodiment the secondary surface does not cover the whole output surface, e.g. display frame, but only a portion thereof. In this case, in an embodiment, the area of the output surface that the secondary surface covers (needs to be considered for) is also indicated to the composition processor. In an embodiment a bounding box that contains the secondary surface is defined and provided to the composition processor (e.g. with the composition processor then only compositing the secondary surface within the area indicated by the bounding box).

The secondary surface may be generated, i.e. the steps of determining which input surfaces to use to form the secondary surface and/or which input surfaces form the different regions of the secondary surface (how the input surfaces are to be arranged within the secondary surface), by any suitable and desired processor or processing element of the overall data processing system, such as a CPU or GPU.

In an embodiment, the secondary surface determination and "construction", and the provision of the data to the composition processor, is performed by a driver for the composition processor (e.g. composition engine and/or compositing display controller) that is to composite the input surfaces to generate the composited output surface. The driver may, e.g., be running on a host processor of the overall data processing system, and in response to commands from an application to, e.g., composite a plurality of input surfaces, then assess the input surfaces and prepare a secondary surface in the above manner, before issuing commands and data to the composition processor to generate the composited output surface.

In an embodiment, as well as providing data representing the secondary surface or surfaces to the composition processor, corresponding data is also provided to the composition processor for any remaining input surfaces that are not part of a secondary surface.

Once the input surfaces to be combined into a secondary surface (or surfaces) have been determined, and data relating to the secondary surface or surfaces (and to any remaining input surfaces) has been provided to the composition processor, the composition processor can then perform its composition operation to composite the secondary surface or surfaces and one or more of any remaining input surfaces to form the desired output surface.

The composition processor in this regard may comprise any suitable processor which can composite a plurality of input surfaces to form an output surface.

Thus it may, for example, and in one embodiment does, comprise a composition engine which can composite input surfaces to form a composited output surface (and then store the composited output surface, e.g. in a frame buffer, for use). In this case, a separate display controller may then, for example, read and display the composited output surface from the frame buffer.

The composition processor could equally be in the form of a compositing display controller which is operable to both composite and display output surfaces (frames). In this case, the compositing display control will read the relevant data from the input surfaces, composite those surfaces, and then provide them to a display for display, without, e.g., writing out the composited output surface to a separate frame buffer.

It would also be possible for the composition processor to be in the form of a compositing display controller that is both operable to composite and display output frames, but also to write such output frames to a frame buffer for other use as well, if desired.

Furthermore, the composition processor may be in the form of a video engine, a camera image signal processor, an image signal processor, a GPU or other processor, that is operable to composite surfaces to provide a composited output frame.

The composition of the secondary surface(s) and any remaining input surfaces may be performed in any desired and suitable manner. The composited output surface can, for example, be generated from the secondary surface(s) and input surface(s) by blending or otherwise combining the secondary and input surfaces. The process can also involve applying transformations (skew, rotation, scaling, etc.) to the secondary and input surface or surfaces, if desired.

The composition processor can use the information that is provided to it indicating the input surfaces that contribute to the secondary surface in any suitable and desired manner when it is performing the composition operation.

In an embodiment, the composition processor uses that information to determine what input surface data to fetch to use for the secondary surface, and in particular to determine which input surface data to use (and fetch) for any given position within the secondary surface (e.g. for each position (e.g. sampling point or pixel) within the area of the secondary surface). In an embodiment, the composition processor then uses that input surface data for the secondary surface with input surface data for the corresponding data position or positions from any other secondary or input surfaces that the secondary surface is to be composited with (and, e.g., overlaps), to generate the composited output surface for the data positions in question.

Thus, in an embodiment, the technology described herein further comprises (and the apparatus further comprises a composition processor configured to) compositing the output surface using at least the secondary surface, wherein the step of compositing the output surface using at least the secondary surface comprises fetching data to be used to form the secondary surface from the input surfaces indicated by the data indicating the input surfaces that contribute to the secondary surface.

Thus, in an embodiment, the composition processor uses the information identifying the input surfaces that are to contribute to the secondary surface to determine the input surface to be used (and to fetch the data for the determined input surface) at a (e.g. at each) secondary surface position that is to be composited into the output surface.

To do this, in an embodiment the composition process/processor reads the information identifying the input surfaces that are to form the secondary surface and then uses that data to fetch data from the identified input surface to be used to form each region of the secondary surface to composite the output surface using the secondary surface.

Thus, in an embodiment, the composition process comprises the steps of (and the composition processor is configured to), for each of two or more regions of the secondary surface:

reading stored data identifying the input surface that is to form the region of the secondary surface; and fetching data from the identified input surface to be used to form the region of the secondary surface.

Thus, another embodiment of the technology described herein comprises a method of compositing an output surface from a plurality of input surfaces, the method comprising:

compositing the output surface using at least a secondary surface, the secondary surface being formed from a respective at least a portion or portions of two or more input surfaces that are to be composited to form the output surface;

wherein the step of compositing the output surface comprises, for each of two or more regions of the secondary surface:

reading data identifying the input surface that is to form the region of the secondary surface;

fetching data from the identified input surface to be used to form the region of the secondary surface; and compositing the output surface using the fetched input surface data.

A further embodiment of the technology described herein comprises a composition processor for compositing an output surface from a plurality of input surfaces, the composition processor comprising processing circuitry configured to:

composite an output surface using at least a secondary surface, the secondary surface being formed from a respective at least a portion or portions of two or more input surfaces that are to be composited to form the output surface; wherein to composite the output surface the composition processor is configured to, for each of two or more regions of the secondary surface:

read data identifying the input surface that is to form the region of the secondary surface;

fetch data from the identified input surface to be used to form the region of the secondary surface; and composite the output surface using the fetched input surface data.

The information identifying the input surface that is to form a region of the secondary surface can be used to fetch the data from the identified input surface in any suitable and desired manner. This will, for example, depend upon the nature of the data that is provided identifying the input surfaces that are to form the secondary surface.

For example, where that data simply indicates where the input surface is stored in memory, the relevant input surface data can then be fetched. In this case, the composition process/processor may then also operate to determine which input surface is to be used for each region of the secondary surface. In an embodiment, as discussed above, in this case the determined input surfaces are ordered (sorted), e.g. by the horizontal coordinate of the leftmost edge of each input surface, and then considered by the composition process/processor in turn.

Alternatively, where the data indicating the input surface that is to form the secondary surface is a more sophisticated data structure, e.g. comprising first, second and third data entries as discussed above, then, in an embodiment, the relevant data entries are read in turn and followed to allow the data for the input surface to be fetched.

Thus, in one embodiment the method further comprises (and the composition processor is configured to):

for each group of one or more lines of the secondary surface:

reading the information identifying the input surface that is to form the secondary surface at each segment along the one or more lines of the group; and for each segment, fetching data from the identified input surface to be used to form the secondary surface at the segment.

Thus in this case, the composition process/processor will determine, along the lines of the secondary surface, which input surfaces are to be used to form the secondary surface, with this information then being used to fetch the data for the respective input surfaces.

In these embodiments, the data identifying the input surface that is used to form the secondary surface at each segment is, in an embodiment, read by the composition processor, into a buffer, where it can be used for the secondary surface being composed. In one embodiment the set of first data entries, i.e. the information about how the groups of lines in the secondary surface are arranged, are fetched into a buffer, e.g. a "header" buffer. Thus the method comprises the step of (and the composition processor is configured to) reading a set of first data entries into a buffer. This enables the set of first data entries to be referred to locally rather than having to fetch the data from the, e.g. main memory, each time it is needed.

In an embodiment the first data entry for the group of lines is then read and the indicated set of second data entries, i.e. the information about how the segments in the group of lines are arranged, are fetched into a buffer, e.g. a "line segment" buffer. Thus the method also comprises the steps of (and the composition processor is also configured to) reading the first data entry for a group of lines and fetching the indicated set of second data entries identifying the input surface that is used to form the secondary surface at respective segments of the group of lines into a buffer. This means that the set of second data entries for a given group of lines does not need to be read in from, e.g. main memory, separately for each line in the group of lines (in the embodiment in which a group of lines comprises a plurality of repeated lines) but can be read locally from the buffer.

Once the information identifying the input surface that is used to form the secondary surface at each segment has been read, in an embodiment, this is then used to fetch the data to be displayed for the identified input surface.

In an embodiment, this is repeated for each segment in the group of lines in order to compose the part of the secondary surface described by the group of lines. This can then be repeated for each group of lines in the secondary surface in order to compose the secondary surface.

In an embodiment, fetched input surface data is cached locally to the composition process/processor, so that it can be more rapidly re-used, if possible.

Therefore, for a given identified input surface, in an embodiment, the cache is first queried as to whether or not it contains the data to be used for the identified input surface. If the data to be used for the identified input surface is present in the cache (a cache "hit"), this can be used to compose the secondary surface, if not the data needs to be fetched into the cache from, e.g., main memory.

When data to be used for an input surface, e.g. for a particular secondary surface segment is required, the data for the whole of the input surface could be read for the composition operation and the desired data for the required, e.g. segment (which will generally be smaller than the entire input surface) then determined and selected. However, in an embodiment, only the necessary input surface data is read in from the, e.g. cache.

Thus, in an embodiment, the composition process (and correspondingly the composition processor is configured to) comprises the step of, for each segment, determining the position and length of the segment and fetching only the data to be displayed for the determined input surface that is used to form the secondary surface for the length of the segment. (However when an input surface is fetched into the cache (if used), in an embodiment, the whole of the input surface is fetched, as it is likely that different parts of the input surface, other than the particular segment initially required, will be required for different parts of the secondary surface.)

The fetched input surface data for use for the secondary surface (or secondary surface part) can then be, e.g., composited as part of the output surface and written to a storage medium (e.g. a frame buffer) for subsequent use, e.g. display, and/or provided directly to a display for display, etc.

One or more of the input surface data, secondary surface data and the output surface data may be stored and/or used in a compressed form. The data being processed may initially be, e.g. stored, in a compressed form but be processed in an uncompressed form, in which case, in an embodiment, the apparatus comprises a decompressor. The processed data subsequently be compressed, in which case, in an embodiment, the apparatus comprises a compressor. In particular, when the composited secondary surface(s), and/or any remaining input surface(s) that are to be used to form the output and/or the output surface, are written out, e.g. to a frame buffer, they may be compressed at this stage.

Thus, in an embodiment, the fetched input surface data to be used for the secondary surface is combined with other secondary surfaces and/or remaining input surfaces, as is suitable and desired, to form the output surface, i.e. in an embodiment the method comprises the step of (and the composition processor is configured to) combine the secondary surface with one or more other secondary surfaces, and/or with one or more of any remaining input surfaces together into the output surface. The output surface may then be ready for display, either as a frame itself or as part of a frame, as discussed above.

Correspondingly, in an embodiment, the method comprises the step of (and correspondingly the composition processor is configured to) writing out the output surface for display. This could be to a frame buffer for display, to another part of the system, e.g. for further processing, or to a device external to the system.

In an embodiment, the operation is then repeated for the next output surface to be composited, e.g. the next display frame, and so on.

The technology described herein can be implemented in any suitable data and/or media processing system, such as a suitably configured micro-processor based system. In some embodiments, the technology described herein is implemented in computer and/or micro-processor based system.

The data processing system that the technology described herein is implemented in can contain any desired and appropriate and suitable elements and components. Thus it may contain one or more of: a CPU, a GPU, a composition processor (e.g. a compositing display controller, or a composition engine and a display controller), a display, and appropriate storage media (memory) for storing the various surfaces (frames) and other data (e.g. information as to which input surfaces are used to form a secondary surface) that is required. In addition, or alternatively, to the GPU, the data processing system may comprise a video engine, a camera image signal processor and/or an image signal processor.

In embodiments of the technology described herein, the composition process/processor may support the use of only a single secondary surface in the manner of the technology described herein, or a plurality (e.g. two) of such secondary surfaces. In an embodiment, it also supports the use of at least one, e.g. plural, single input surfaces in combination with a secondary surface or surfaces.

In the event that an output surface is to be composited for more input surfaces than the composition process/processor can composite in a single operation (even with the use of a secondary surface or surfaces in the manner of the technology described herein), then in an embodiment the composition of some or all of the "excess" input surfaces is offloaded to and performed on another processor, such as a GPU or CPU of the system.

The composition processor and/or the apparatus for compositing an output surface may, and in an embodiment does, also comprise, and/or is in communication with, one or more memories and/or memory devices that store the data described herein, and/or that store software for performing the processes described herein. The composition processor and/or apparatus may be in communication with a host microprocessor, and/or with the display for displaying images based on the data generated.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner. Similarly, the display that the surfaces are to be displayed on can be any suitable such display, such as a display screen of an electronic device, a monitor for a computer, etc.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer, compositing display controller, or other system comprising a data processor causes in conjunction with said data processor said processor, renderer, controller, or system to carry out the steps of the methods of the technology described herein. Such a computer software carrier could be a physical storage medium such as a ROM chip, CD ROM, RAM, flash memory, or disk.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. The series of computer readable instructions embodies all or part of the functionality described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

As shown in FIG. 1, a typical example of a composited output surface (e.g. a display frame) 10 comprises four separate input surfaces 1, 2, 3, 4, each of which contains a rectangle to display. Surface 4 does not overlap any of the other surfaces, but surfaces 1, 2 and 3 each overlap and are alpha-blended with each other, i.e. surface 1 and 3 are translucent, with surface 1 being positioned in front of surface 3, which in turn is positioned in front of surface 2 in screen space.

Figure 2:
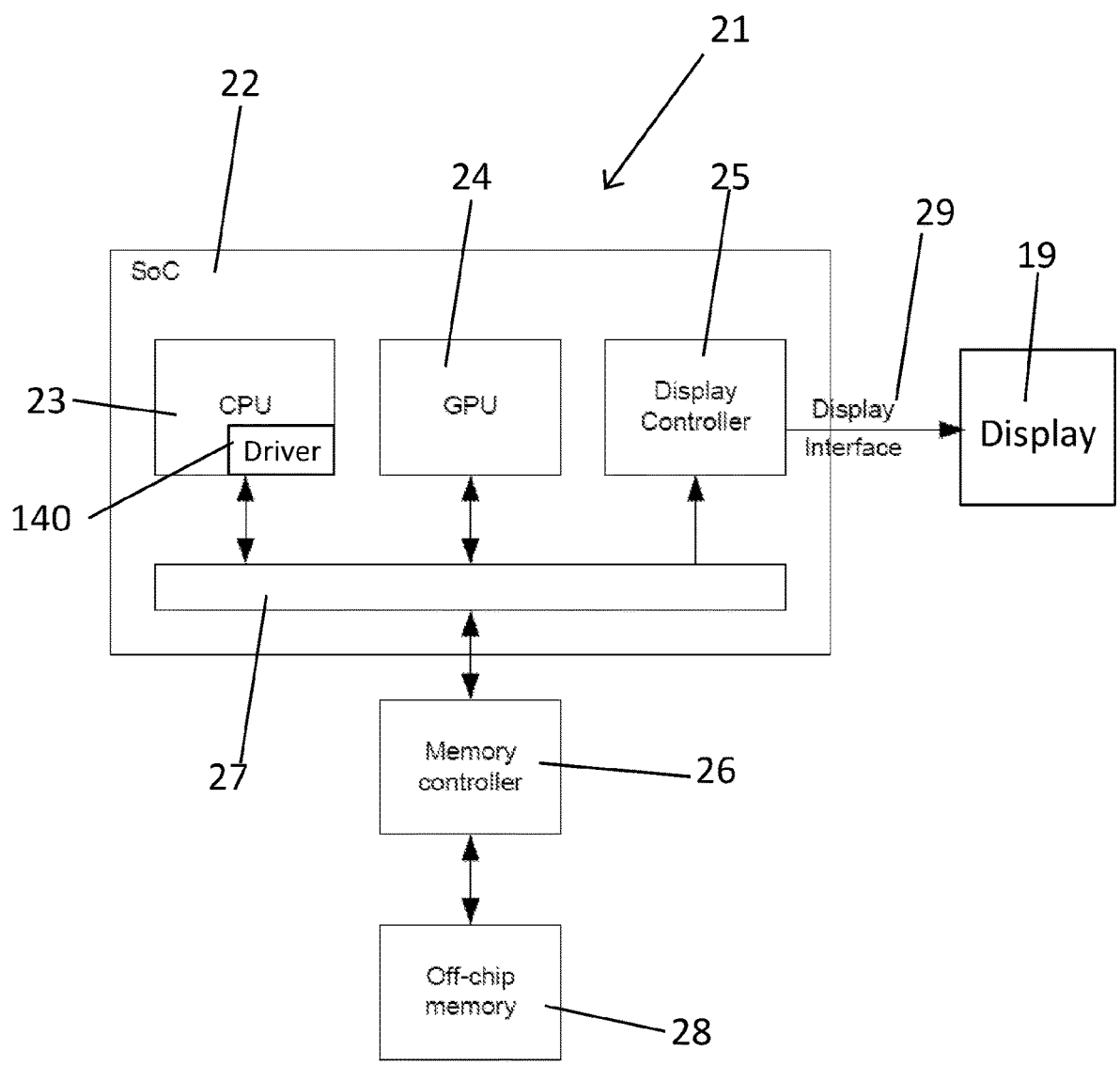
FIG. 2 shows schematically a data processing system that can operate in accordance with the described embodiments of the technology described herein.

FIG. 2 shows schematically an exemplary data processing system 21 that can perform the basic operation of the technology described herein.

As shown in FIG. 2, the data processing system 21 comprises a system on-chip (SoC) 22 which includes a CPU 23, a GPU 24, and a display controller 25, that communicate via an interconnect 27, and that all have access to an off-chip memory 28 via a memory controller 26. In this embodiment, the display controller 25 is a compositing display controller that is itself capable of and operates to composite a display frame from multiple input surfaces. The display controller 25 has a display interface 29 for data communication with a display 19. A driver 140 for the display controller 25 runs on the CPU 23.

The system may also or instead (e.g. instead of the GPU 24) include a video engine (processor), a camera image signal processor, and/or an image signal processor, if desired.

In accordance with the present embodiments, input surfaces to be composited into an output surface are generated as desired by, for example, being appropriately rendered by the GPU 24. The generated input surfaces are then written to the off-chip memory 28.

In order to reduce the demand on the hardware resources in the data processing system, in the present embodiment the driver 140 for the display controller 25 combines a number of the input surfaces into an intermediate secondary surface. This secondary surface can then be used when compositing the output surface, e.g. with other secondary surfaces and any remaining input surfaces, as is appropriate for the output surface being composited.

To do this, as will be described below, the driver 140 first selects which input surfaces are to be used to form the secondary surface. From this selection of input surfaces, the driver 140 then determines how the input surfaces are to be arranged to form the secondary surface. Information indicating the arrangement of the input surfaces is then generated, in an appropriate manner, e.g. through the use of a data structure written out to one or more buffers. The secondary surface can then be used, along with other surfaces as are necessary, to composite the output surface.

Figure 3:
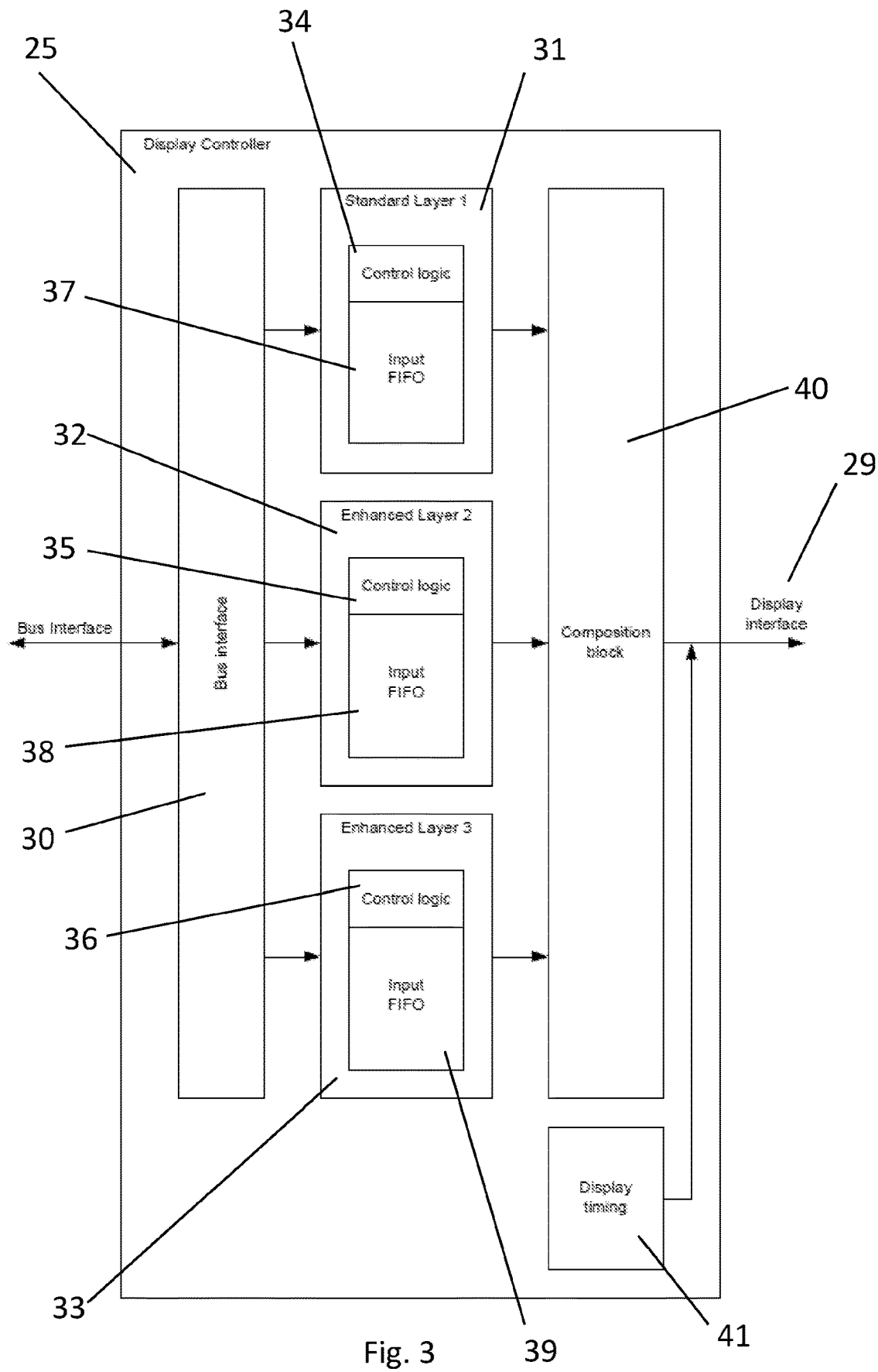
FIG. 3 shows schematically a compositing display controller that can operate in accordance with the described embodiments of the technology described herein.

FIG. 3 shows schematically an exemplary compositing display controller 25 that can operate in accordance with the described embodiments of the technology described herein.

As shown in FIG. 3, the compositing display controller 25 comprises a bus interface 30 via which input surfaces, generated by the GPU 24, can be read, as will be described below. The bus interface 30 is in data communication with a number of (here three) hardware modules 31, 32, 33, two of which (hardware modules 32 and 33) are operable to (at least partly) generate a secondary surface from multiple input surfaces for compositing in the final output frame. The other hardware module 31 is configured to process an input surface for composition into the final display frame with the other two secondary surfaces.

Each of the hardware modules 31, 32, 33 comprises some control logic 34, 35, 36 and an input FIFO buffer 37, 38, 39, and sends its output to a composition block 40, which combines the input surface from one of the hardware modules 31 and the secondary surfaces from the other hardware modules 32, 33 into an output display frame. The output display frame from the composition block 40, along with display timing information from a display timing module 41, is sent to the display interface 29.

For a display frame 10 as shown in FIG. 1, for example, a secondary surface, e.g. formed from input surfaces 1 and 4, will need to be alpha blended with the other input surfaces 2, 3 to form the final display frame. Thus the secondary surface may be held in one hardware module 32 of the compositing display controller 25 and each of the input surfaces are held in other hardware modules 31, 33, from where they are combined by the composition block 40 and output to the display interface 29.

Figure 4:
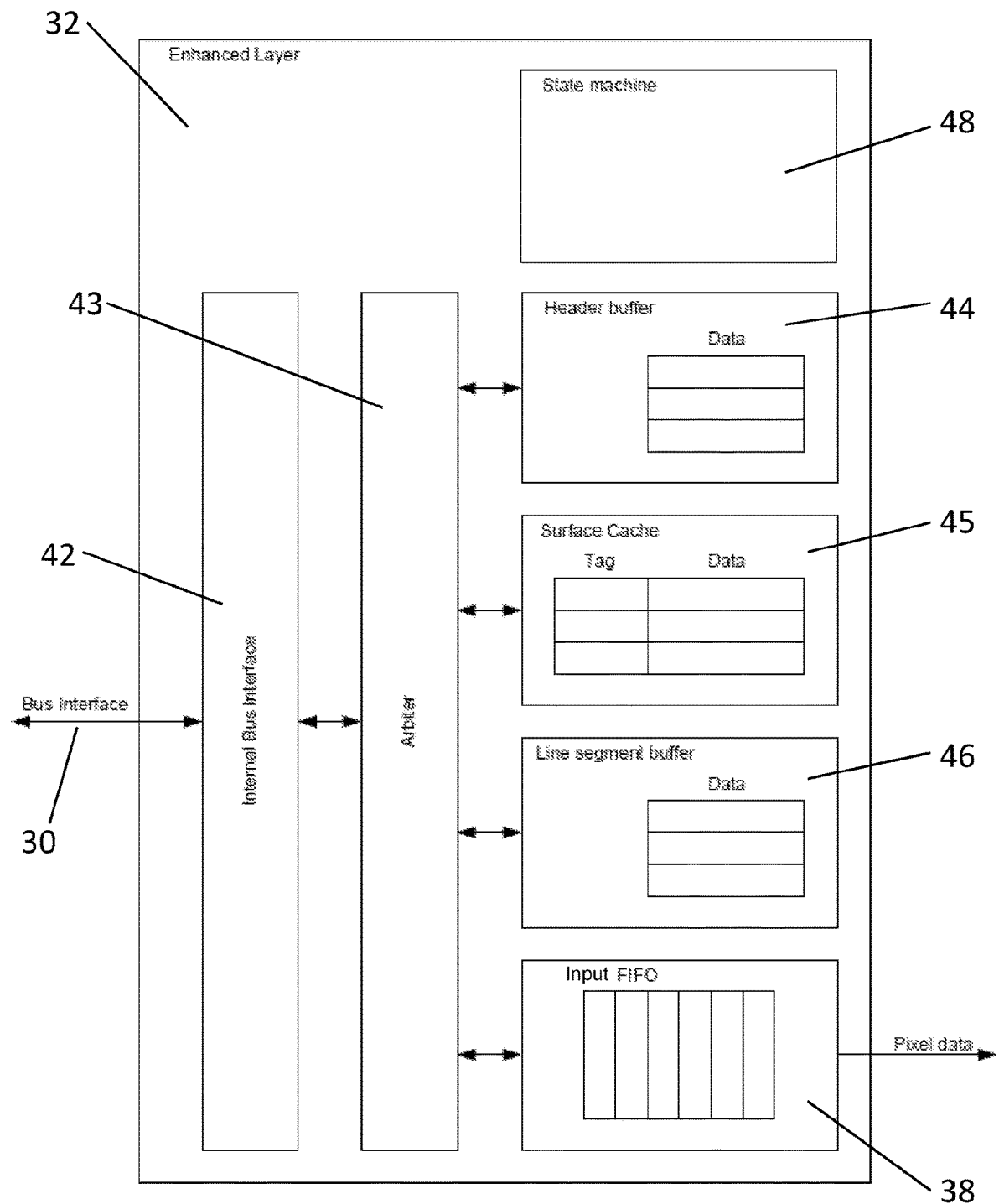
FIG. 4 shows schematically a hardware module of the compositing display controller that can operate in accordance with the described embodiments of the technology described herein.

FIG. 4 shows schematically an exemplary hardware module 32 or 33 of the compositing display controller 25 that can operate in accordance with the described embodiments of the technology described herein.

As shown in FIG. 4, the hardware module 32 comprises an internal bus interface 42 which communicates with the display controller's bus interface 30 (as shown in FIG. 3) to read in data relating to and for the input surfaces which have been generated by the GPU 24. The internal bus interface 42 is in data communication with an arbiter 43 which, as will be described in more detail below, determines how the input surfaces are to be used in the secondary surface.

The arbiter 43 uses information, generated in accordance with an embodiment of the technology described herein as will be described, which is stored in a header buffer 44, a line segment buffer 46, and a surface cache 45, to form the secondary surface from the input surfaces. As also shown in FIG. 3, the hardware module 32 also comprises an input FIFO 38 which receives pixel data assembled by the arbiter 43 for outputting to the composition block 40 of the display controller 25 (as shown in FIG. 3). The hardware module 32 also comprises a state machine 48 which forms the control logic 35 of the hardware module 32.

The header buffer 44, the surface cache 45 and the line segment buffer 46 will now be described in more detail with reference to the data structures shown in FIGS. 5, 6 and 7.

Figure 5:
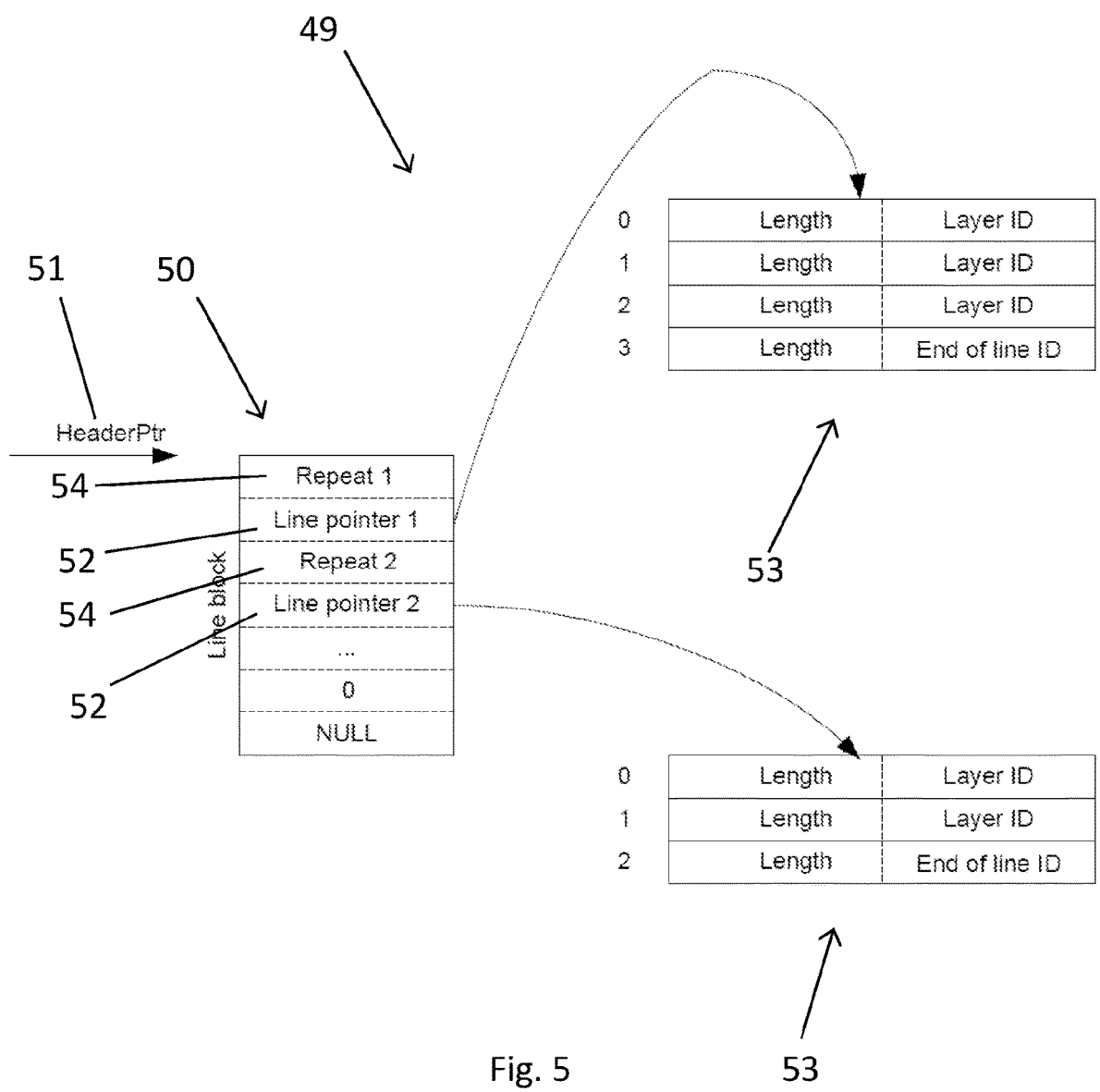
FIGS. 5, 6, 7a and 7b show data structures that can be used in accordance with the described embodiments of the technology described herein.

FIG. 5 shows a data structure 49 that is generated by a driver 140 for the compositing display controller 25 and subsequently read into the header buffer 44 and the line segment buffer 46 of the hardware module 32 of the compositing display controller 25, in order to detail the layout of the input surfaces in a secondary surface. The data structure 49 includes a "header" data structure 50 which is referred to by a header pointer 51, and comprises a plurality of lines which contain pointers 52 to "line" data structures 53, along with repeat counters 54 that specify how many times each line is to be repeated consecutively in the secondary surface, i.e. how many times each pointer 52 is to be followed. The "line" data structures 53 are shown in more detail in FIG. 6.

Figure 6:
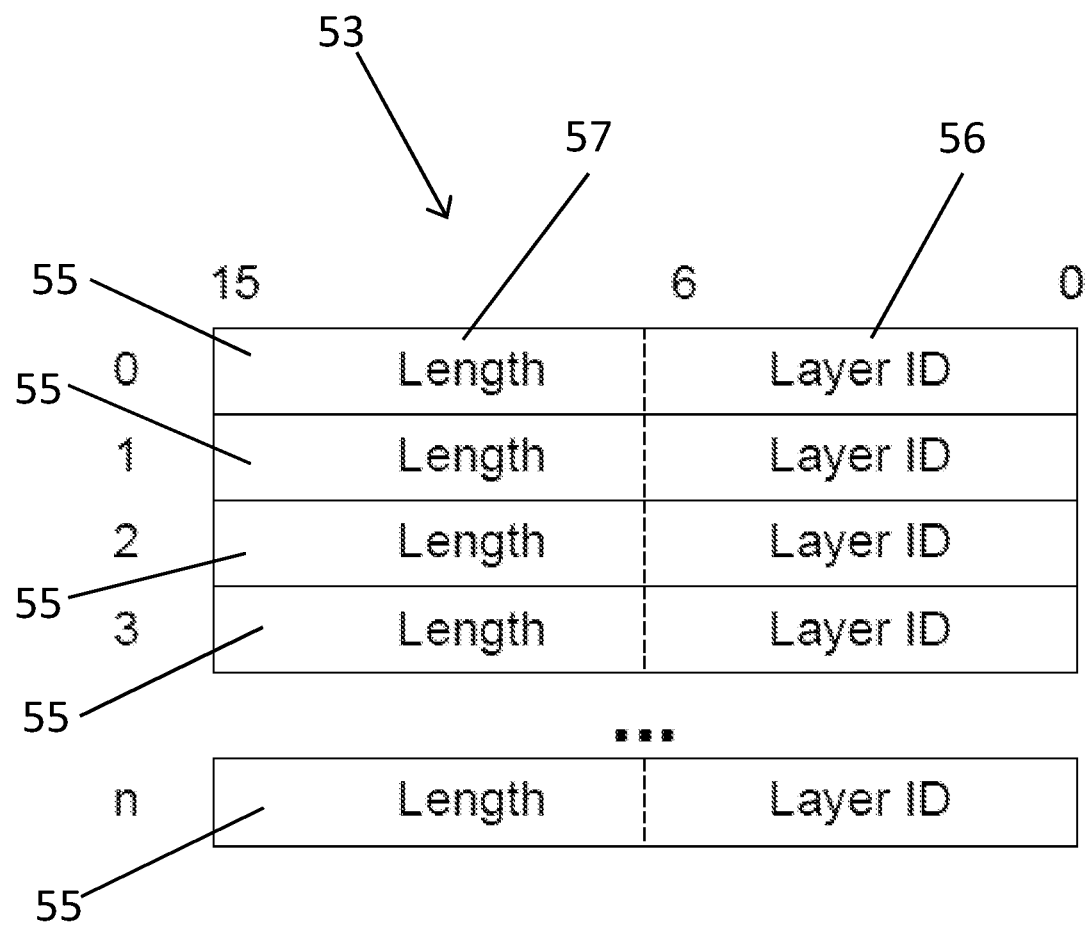

FIG. 6 shows the data structure 53 for a line of a secondary surface. The line is divided into segments along which the same input surface is used to form the secondary surface, with each segment being allocated an entry 55 in the line data structure 53. These entries 55 are read into the line segment buffer 46 of the hardware module 32 when required. In this embodiment each segment entry 55 is 16 bits wide, with the bits 0-6 being allocated for the ID 56 of the input surface that is used to form the secondary surface for the line segment and the bits 7-15 being allocated for the length 57 of the line segment, i.e. the number of pixels in the line segment. The input surface ID 56 allows the details of the input surface for each line segment to be fetched when required.

Figure 7A:
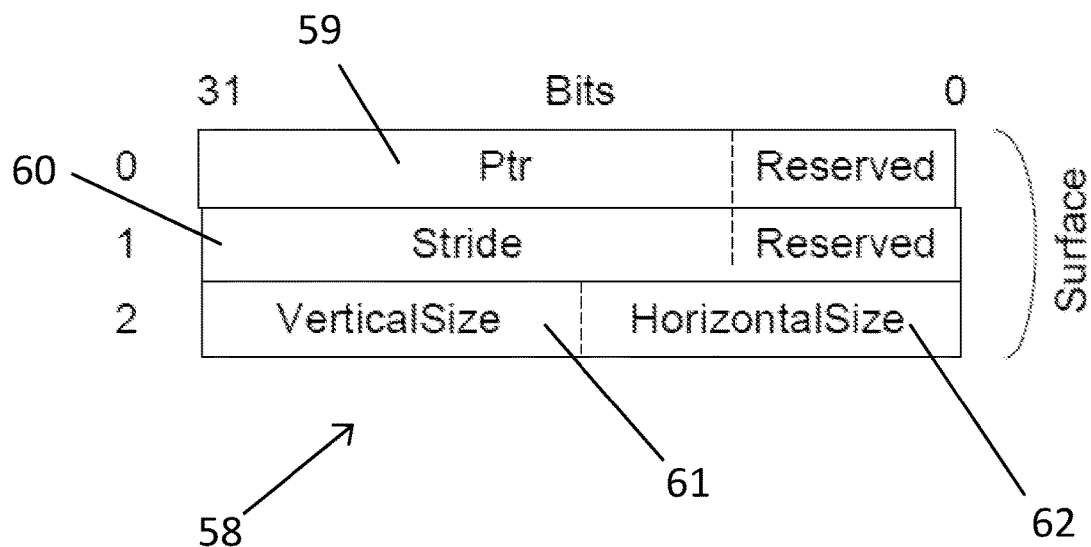

An example data structure 58 for an input surface is shown in FIG. 7a. The data structure 58 for an input surface is described by three data words which are each 32 bits wide. These data structures 58 for the input surfaces are fetched into the surface cache 45 of the hardware module 32 as and when they are required. The data structure 58 comprises a pointer 59 to the actual data for the input surface (the first word), the stride 60 of the array (the second word) and the horizontal and vertical sizes 61, 62 of the input surface (the third word). The input surface data structure 58 may also contain other information, such as frame buffer format information, rotation information and/or scaling information, etc., if desired.

Figure 7B:
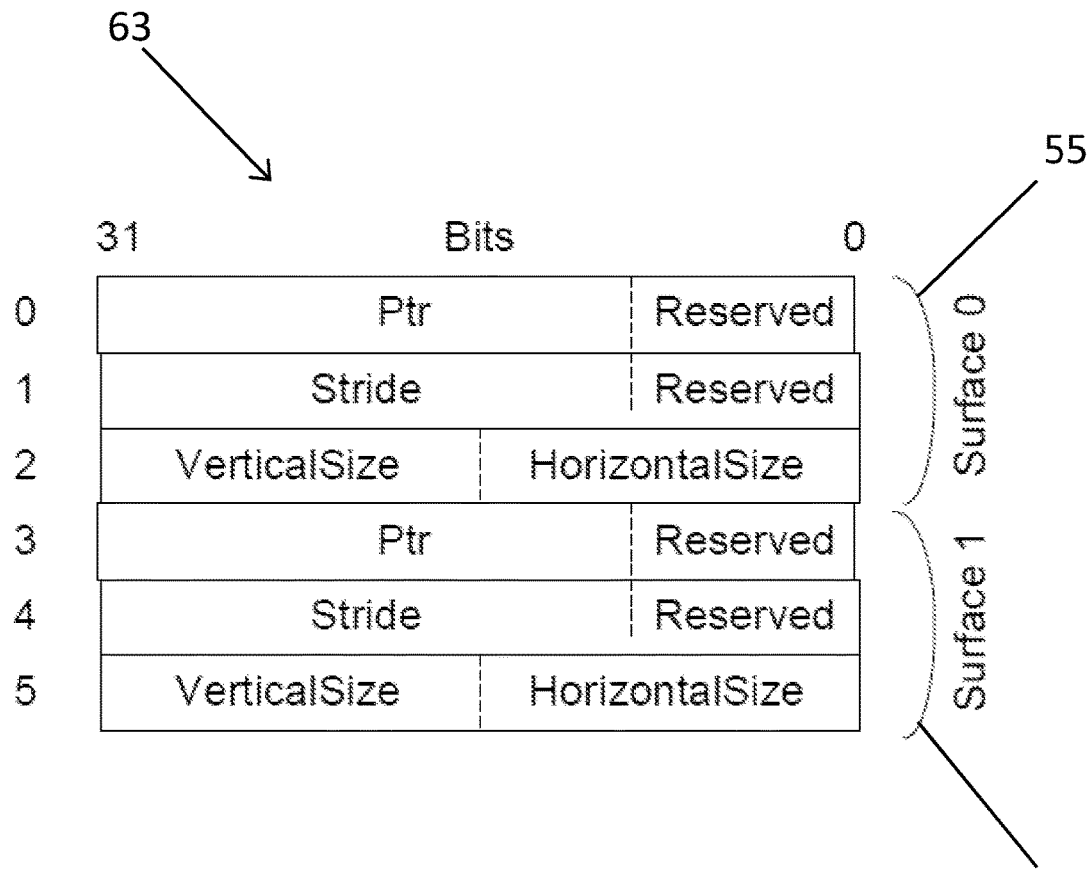

FIG. 7b shows an example data structure 63 for multiple input surfaces. The data structure comprises multiple entries 64, each of which represents an input surface and has the same format as the individual data structure 58 shown in FIG. 7a. Thus the individual data structures for the input surfaces are stored back to back in the memory. The address of a data structure, i.e. its line number in the overall data structure 63, for a particular input surface can be calculated easily by knowing the address at the start of the data structure 63 of the multiple input surfaces, and the position of the individual data structure within the overall data structure 63. The input surfaces may, e.g., be ordered in the overall data structure 63 according to their depth in the secondary surface, though this is not necessary.

Figure 8:
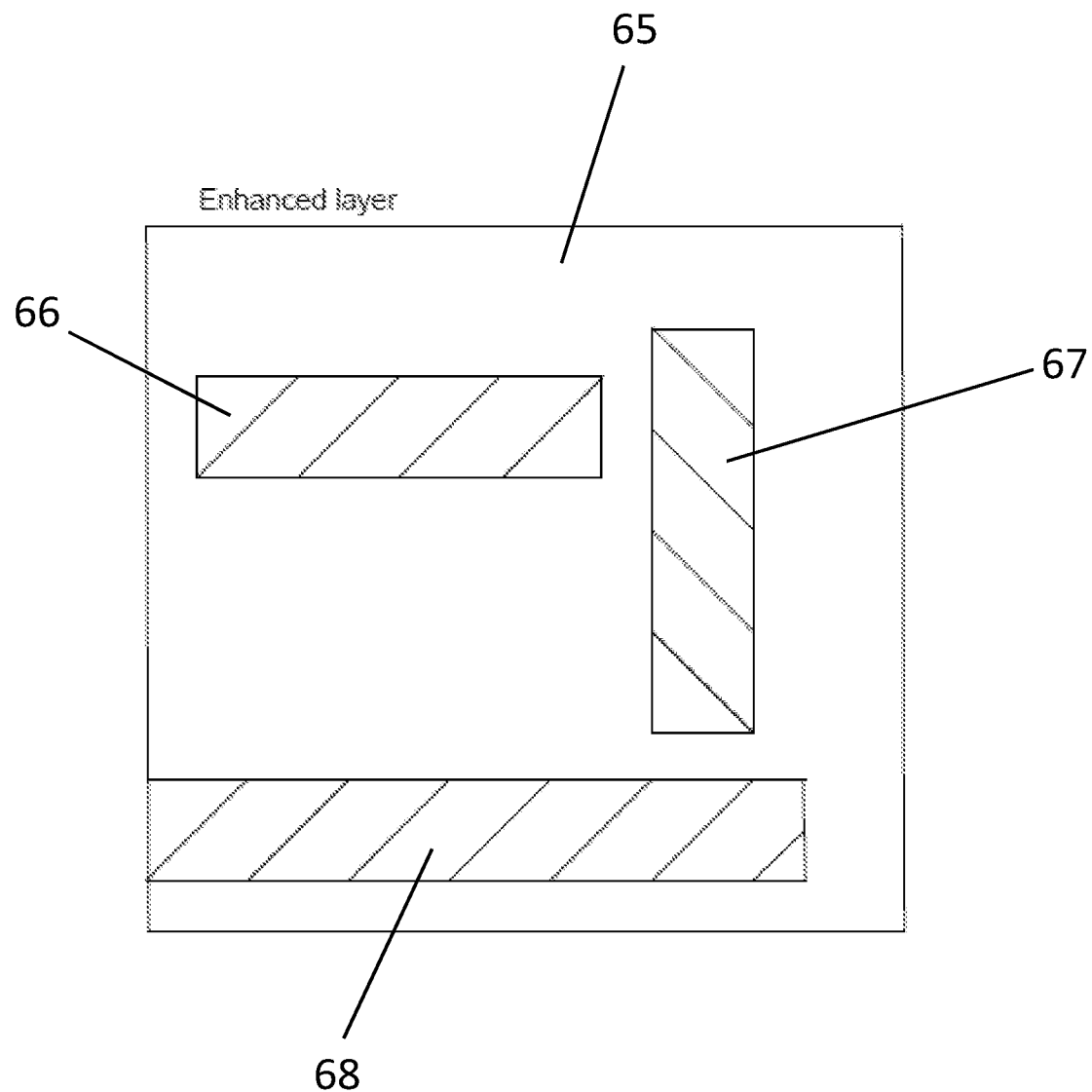
FIGS. 8, 9a and 9b show examples of secondary surfaces which can be composited in accordance with the described embodiments of the technology described herein.

FIG. 8 shows an example of a secondary surface 65 which can be composited using an embodiment of the technology described herein from multiple input surfaces. The secondary surface 65 comprises three input surfaces 66, 67, 68 which are all rectangular in shape and do not overlap. The remaining parts of the secondary surface are not covered by any input surfaces and are thus blank. Generally this means that these parts of the secondary surface will be transparent to any secondary surfaces behind, and/or set to a default background colour.

Figure 9A:
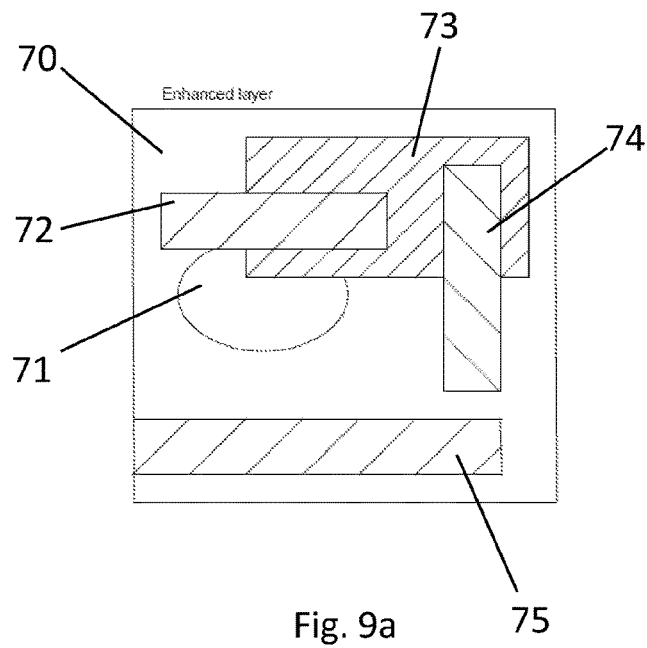

FIG. 9a shows a further example of a secondary surface 70 which can be composited using the technology described herein. The secondary surface 70 comprises five input surfaces 71, 72, 73, 74, 75, four of which 71, 72, 73, 74 which have some degree of opaque overlap with each other and one input surface 75 which does not overlap at all with the other four input surfaces 71, 72, 73, 74.

Figure 9B:
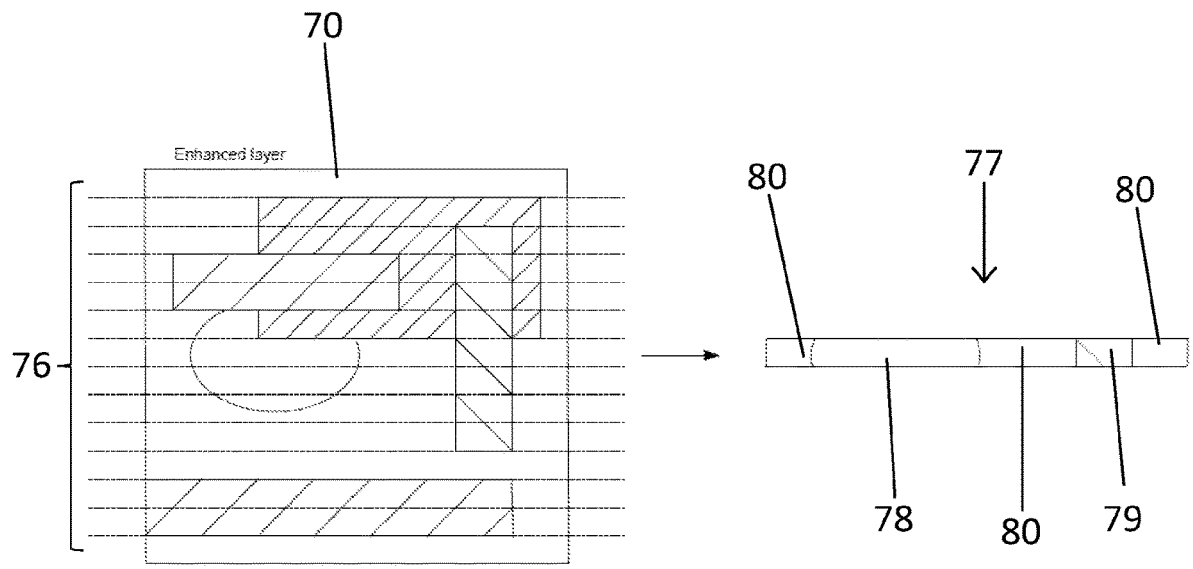

FIG. 9b shows how, in accordance with the embodiments of the technology described herein, the secondary surface 70 is divided up into lines 76, one of which 77 is shown separately for the purpose of clarity. (Also for the purposes of clarity the lines each have a thickness of several pixels whereas, at least in embodiments of the technology described herein, each line may only be a single pixel thick.) As shown in the separate line 77, each line 76 is therefore made up of segments 78, 79 of input surfaces, such that each line 76 can be defined by the length of each segment 78, 79 and the input surface to be displayed in the respective segment, as well as the parts 80 which are blank, i.e. are not covered by an input surface (and, therefore transparent).

Figure 10A:
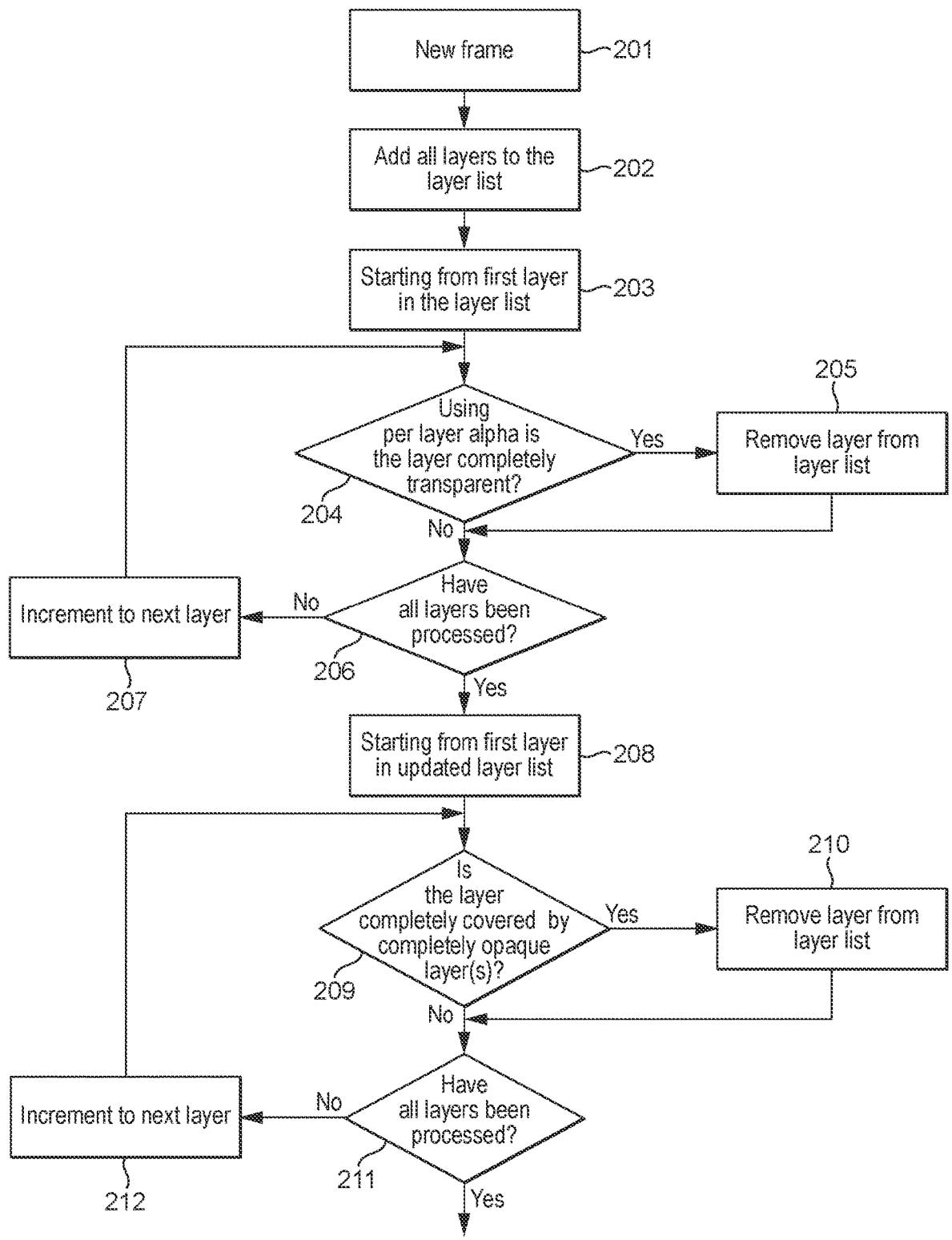
FIGS. 10a, 10b and 10c show a flowchart illustrating the operation of the system according to embodiments of the technology described herein.
Figure 10B:
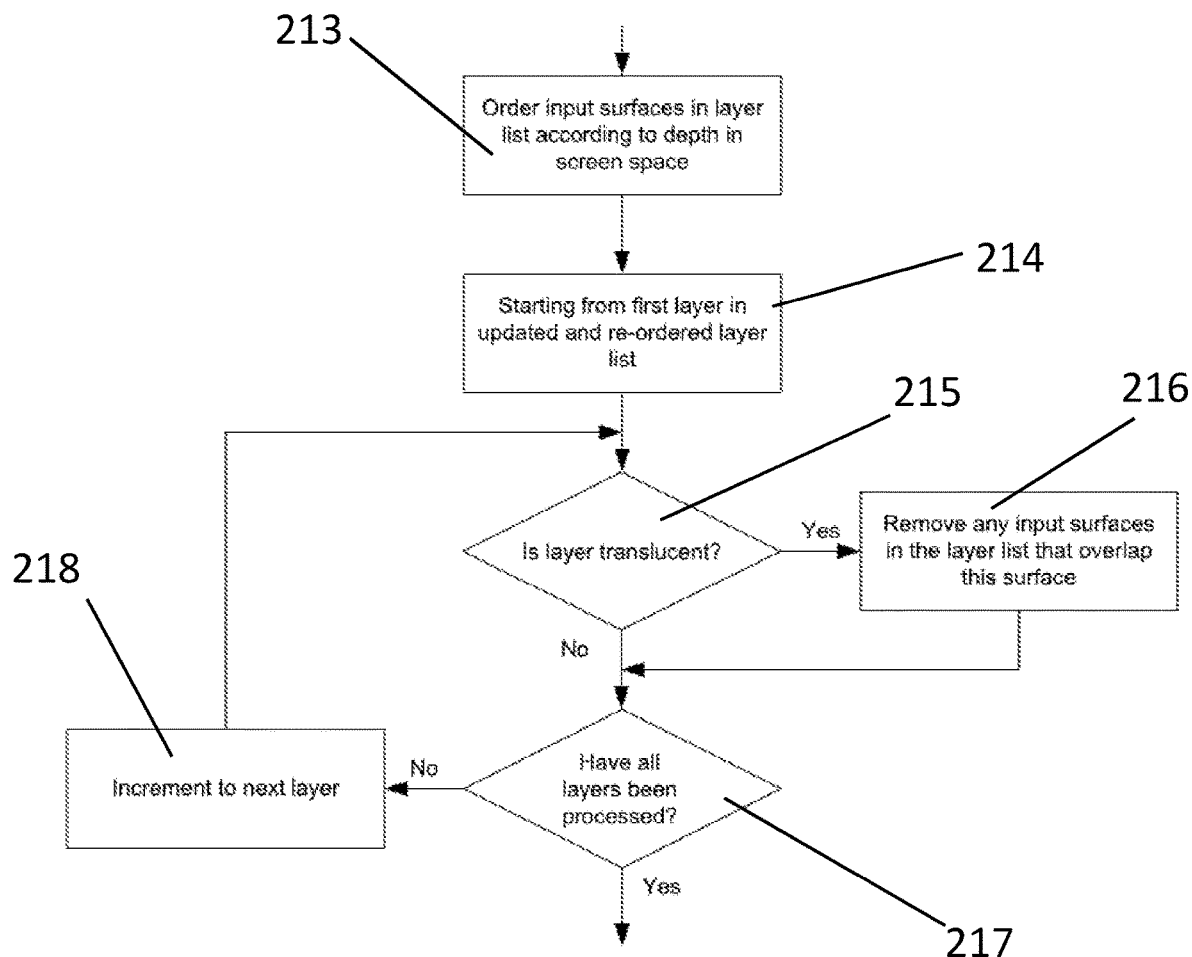
Figure 10C:
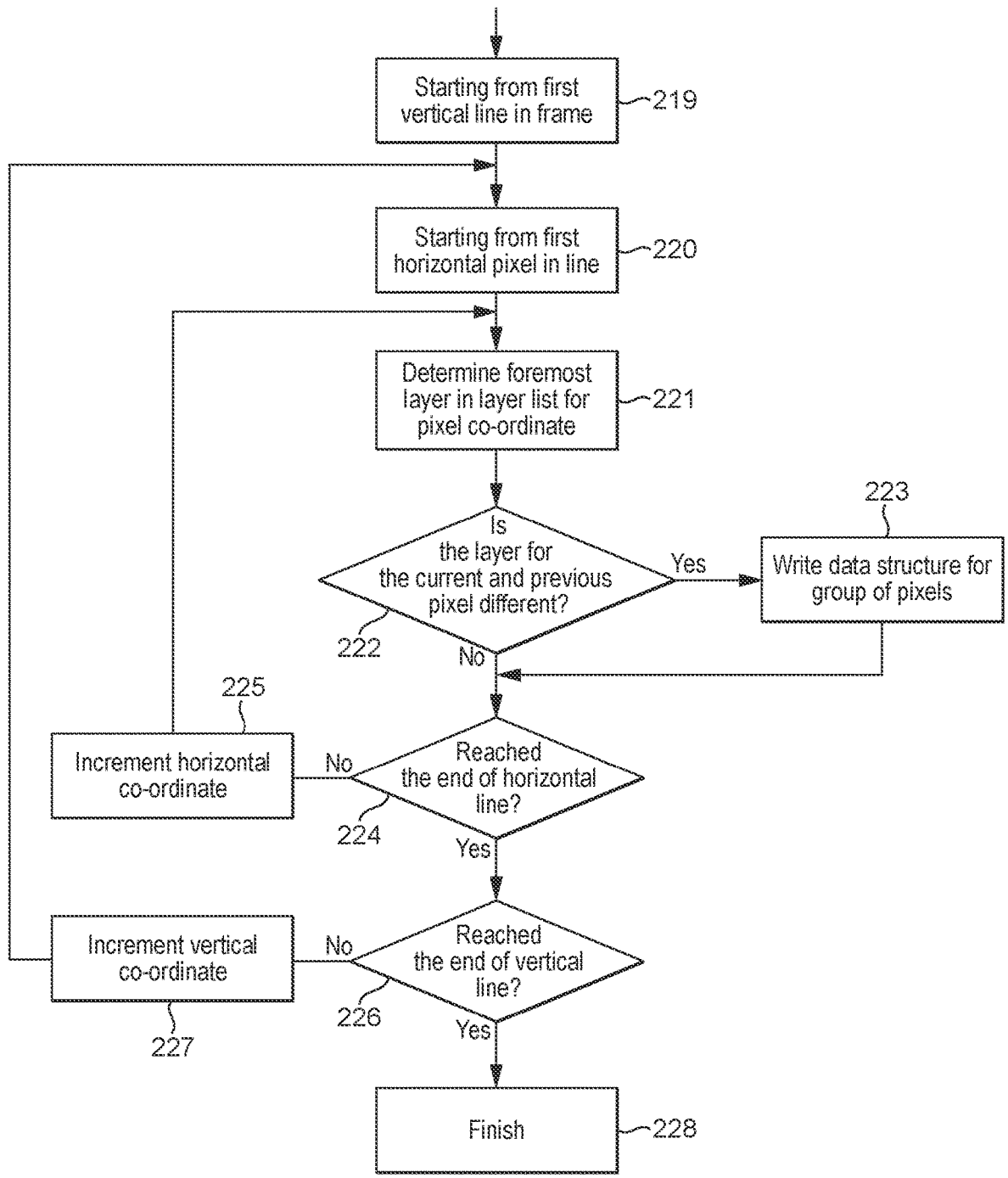

Operation of the data processing system 21 in FIG. 2, in accordance with embodiments of the technology described herein, will now be described with reference to FIGS. 1 to 11. FIGS. 10a, 10b and 10c show a flowchart illustrating the operation of the system according to embodiments of the technology described herein.

To produce an output frame (step 201, FIG. 10a), e.g. as shown in FIG. 1 (display frame 10a), first a number of input surfaces 1, 2, 3, 4 which are to form the display frame 10 are rendered by the GPU 24 of the data processing system 21 and stored in respective frame buffers in the main memory 28. Surface 4 does not overlap any of the other surfaces, but surfaces 1, 2 and 3 each overlap and are alpha-blended with each other, i.e. surfaces 1 and 3 which are positioned in front of surface 2 in screen space are translucent. The attributes of the input surfaces 1, 2, 3, 4, e.g. their size, position, depth ordering (from front to back in screen space) and translucency (alpha values), produced by the GPU 24 when rendering them, are also stored in association with the input surfaces.

The driver 140 of the compositing display controller 25 (that is, e.g., executing on the CPU 23) uses the attribute information of the input surfaces 1, 2, 3, 4 and creates a "layer list" of the input surfaces 1, 2, 3, 4 (step 202, FIG. 10a). Starting with the first input surface in the layer list (step 203, FIG. 10a), the alpha value for that input surface is used to determine when the input surface is completely transparent, i.e. when alpha equals 0 (step 204, FIG. 10a). This is straightforward to determine when the alpha value of an input surface is set for the whole of the input surface, for example. In more complex situations, e.g. when the alpha value is stored per pixel, (and otherwise) this step may be skipped, if desired. when the input surface is completely transparent it is discarded from the layer list (step 205, FIG. 10a), otherwise it is retained in the layer list.

The driver 140 then checks whether or not all the input surfaces in the layer list have been considered (step 206, FIG. 10a) and, if not, the next input surface in the layer list is processed (step 207, FIG. 10a), with its alpha value being used to determine when the input surface is completely transparent (step 203, FIG. 10a). This continues until all the input surfaces in the layer list have been considered by the driver 140. (It can be seen from FIG. 1 that none of the input surfaces 1, 2, 3, 4 are completely transparent, so all of them are retained in the layer list at this stage.)

At this stage the driver 140 now has an updated layer list which does not include any completely transparent input surfaces. Starting from the first input surface in the updated layer list (step 208, FIG. 10a), the size and position of that input surface, along with the size, position and alpha values for the other input surfaces in the updated layer list are used by the driver 140 to determine when the first input surface is completely covered by completely opaque input surfaces (step 209, FIG. 10a). When the input surface is completely obscured it is discarded from the layer list (step 210, FIG. 10a), otherwise it is retained in the layer list.

The driver 140 then checks whether or not all the input surfaces in the layer list have been considered (step 211, FIG. 10a) and, if not, the next input surface in the layer list is processed (step 212, FIG. 10a), to determine whether or not it is completely covered by other opaque input surfaces (step 209, FIG. 10a). This continues until all the input surfaces in the updated layer list have been considered by the driver 140. (It can be seen from FIG. 1 that none of the input surfaces 1, 2, 3, 4 are completely obscured, so all of them are retained in the layer list at this stage.)

At this stage the driver 140 now has an updated layer list which does not include any completely transparent input surfaces or input surfaces which are completely obscured by other opaque input surfaces. To perform the next step, the input surfaces are first reordered according to their depth in screen space, i.e. starting with the foremost and increasing in depth (step 213, FIG. 10b). Then, starting from the first input surface in the updated and reordered layer list (step 214, FIG. 10b), the alpha value for this input surface in the updated layer list, is used by the driver 140 to determine when the input surface (i.e. the foremost) is translucent (step 215, FIG. 10b), i.e. has an alpha value between, but not including, 0 and 1. When the input surface is translucent then any other input surfaces in the updated layer list which it overlaps at least partially are discarded from the layer list (step 216, FIG. 10b), using the size and position of the foremost input surface, along with the size and position for the other input surfaces in the updated layer list, otherwise the input layers are retained in the layer list.

The driver 140 then checks whether or not all the input surfaces in the layer list have been considered (step 217, FIG. 10b) and, if not, the next input surface in the layer list (by depth in the reordered layer list) is processed (step 218, FIG. 10b), to determine whether or not it is translucent (step 215, FIG. 10b) and then whether it overlaps any other input surfaces in the updated layer list (step 216, FIG. 10b). This continues until all the input surfaces in the updated layer list have been considered by the driver 140. (It can be seen from FIG. 1 that input surface 1 is translucent, as well as overlapping and being in front of input surfaces 2 and 3. Surfaces 2 and 3 are removed from the layer list and the updated layer list therefore contains surfaces 1 and 4.)

At this stage the updated layer list now contains the input surfaces, i.e. input surfaces 1 and 4, that may be suitable for combining into a secondary surface.

Once the list of input surfaces that may be suitable for combining into a secondary surface has been determined, i.e. input surfaces 1 and 4, the driver 140 for the compositing display controller 25 that is executing on the CPU then determines whether and how to combine the input surfaces in the layer list into a secondary surface.

The production and composition of the secondary surface from these input surfaces will now be described with reference to FIGS. 10c and 11.

To generate the secondary surface to use as part of the display frame 10 shown in FIG. 1, the driver 140 for the compositing display controller 25 determines which and how the input surfaces 1, 4 in the updated layer list, are to contribute to the secondary surface, i.e. determines the relative positioning of the input surfaces 1, 4 with respect to each other, both in the plane of the secondary surface and the depth order within it. This is done by splitting up the secondary surface into separate lines which run horizontally across the display frame 10.

For each line of the secondary surface, starting with the first vertical line in the secondary surface (step 219, FIG. 10c) the driver 140 for the compositing display controller 25 determines which of the input surfaces 1, 4 is to be used to form the secondary surface for all the points along the line, as well as if there are any points for which no input surface is to be used to form the secondary surface, e.g. the secondary surface is blank and transparent.

Starting from the first horizontal pixel in this line (step 220, FIG. 10c), of the input layers 1, 4 remaining in the updated layer list, the foremost input surface (in screen space) is determined for that pixel (step 221, FIG. 10c). The input surface for that pixel is compared with the input surface for the previous pixel to see if they are different (step 222, FIG. 10c). If the pixels have the same input surface, then the driver determines if the end of the horizontal line has been reached (step 224, FIG. 10c). If not, the horizontal co-ordinate is incremented (step 225, FIG. 10c) and the next pixel is considered as to its foremost input surface (i.e. repeating step 221, FIG. 10c).

If adjacent pixels have a different input surface, i.e. the end of a segment has been reached, a data entry 53 containing an entry 55 for the previously considered segment, indicating the length 57 of the segment and the input surface 56 to be displayed for that segment or that the segment is blank (e.g. using a null code), is written out to appropriate storage by the driver (step 223, FIG. 10c).

Referring to FIG. 1, it can be seen that in the first vertical line, input surface 1 is the foremost input surface for the whole of the horizontal line and thus is used to form the secondary surface.

Once the end of the horizontal line has been reached, the driver determines if the end of the vertical line has been reached, i.e. have all the horizontal lines been considered (step 226, FIG. 10c). If not, the vertical co-ordinate is incremented (step 227, FIG. 10c) and the next horizontal line is considered (i.e. reverting to step 220, FIG. 10c).

Referring back to FIG. 1, it can be seen that for the first group of horizontal lines, input surface 1 is the foremost input surface and thus is used to form the secondary surface. Once the vertical extent of input surface 1 has been reached, it can be seen that for the next group of horizontal lines, there is no input surface present in the updated layer list for the secondary surface, i.e. input surfaces 2 and 3 were discarded for being overlapped by translucent input surface 1. Finally, at the bottom of the display frame 10, input surface 4 is the foremost input surface and is thus used to form the secondary surface.

Once all the vertical lines have been considered, the data structure is complete (step 228, FIG. 10c). The secondary surface in FIG. 1 is thus formed from input surfaces 1 and 4 (along with a region in the middle for which no input surface is used), with the necessary information to having been written out to form the data structure.

As each of the input surfaces 1, 4 determined as forming the secondary surface extend horizontally all the way across the display frame 10, i.e. they are used to form the secondary surface for a number of consecutive points along each line across the secondary surface, each line is formed from a single segment for which the same input surface 1 or 4 is used to form the secondary surface.

The driver 140 for the compositing display controller 25 determines the segment information for each line of the secondary surface, from the surface attribute information, i.e. the size, position and ordering of the input surfaces, as shown in FIG. 1, which are supplied to the driver 140 by the GPU 24. The segment information for each line is then written out by the driver 140 to memory from where it can be read by the hardware module 32 of the compositing display controller 25 and stored in the line segment buffer 46 in the format shown in FIG. 6, i.e. for each line, a separate data entry 53 contains an entry 55 for each segment that indicates the length 57 of the segment and the input surface 56 to be displayed for that segment or if the segment is blank (e.g. using a null code).

Along with a "line segment" data entry 53 for each line being written out by the driver, a "header" data entry 50 for the secondary surface, as shown in FIG. 5, is also written out and stored. To determine the information to write out into this data entry 50, the driver of the compositing data controller 25 has to determine if the layout of a line is identical to that of a previous line, i.e. will the segment information be the same, and if so, how many times is the layout repeated. This results in the data entry 50 for the secondary surface being able to be written as a series of repeat counters 54 and line pointers 52 to the data entries 53 for each line, such that a line pointer 52 can be followed the correct number of repeated times. Thus, following this analysis, only the line segments that differ from each other are written out as part of the "line segment" data entry 53.

In the example display frame 10 shown in FIG. 1 it can be seen that input surface 1 is repeated for a number of horizontal lines, a region with no input surface is then repeated for a large number of horizontal lines and then input surface 4 is repeated for a smaller number of horizontal lines.

Once the data structures for the secondary surface have been generated and stored, i.e. the data structures 58, 63 for the input surfaces 1 and 4, the data entry 50 for the secondary surface and the data entries 53 for each line, the output surface can be composited using the secondary surface. This will now be described with reference to FIG. 11 which shows a flowchart illustrating the operation of the display controller according to embodiments of the technology described herein.

Figure 11:
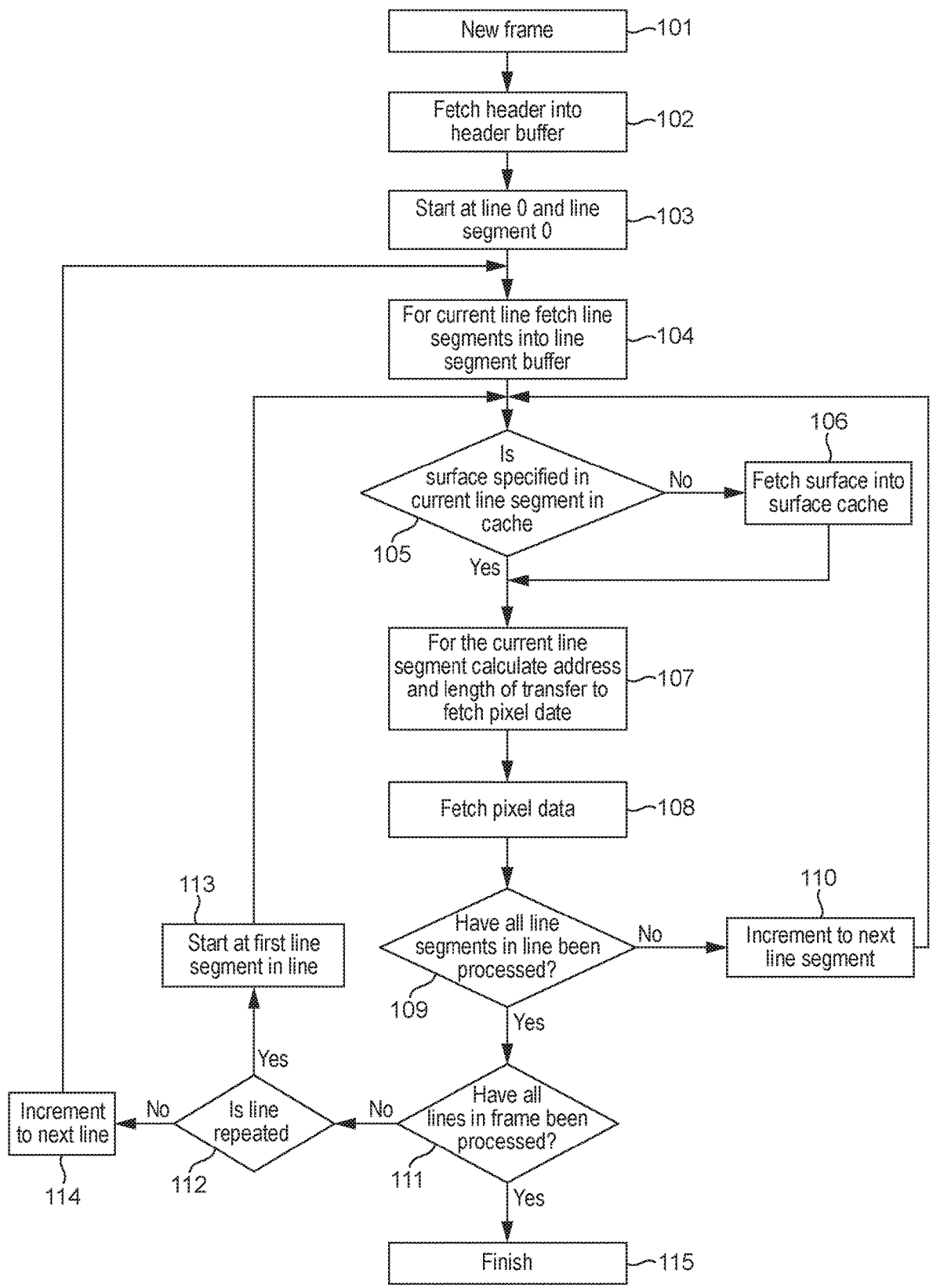
FIG. 11 shows a flowchart illustrating the operation of the display controller according to embodiments of the technology described herein.

First, the drawing of a new output surface (frame) is initiated (step 101, FIG. 11).

To determine the pixel data to be used for the secondary surface when compositing the output surface, the "header" data entry 50 for the secondary surface is fetched into the header buffer 44 (step 102, FIG. 11). In the "header" data entry 50, the line pointer 52 for the first line (line 0) is followed (step 103, FIG. 11) to retrieve the data entry 53 for the first line, containing entries 55 for each segment 55 to be displayed along the line. This data entry 53 is fetched into the line segment buffer 46 (step 104, FIG. 11).

Starting at the first segment (segment 0) of the first line (line 0), the surface cache 45 is queried as to whether the data indicating where the input surface to be displayed for that segment is stored (i.e. the input surface with the surface ID 56 specified in bits 0 to 6 of the data entry 55 for the first segment of the data entry 53 for the first line), is present in the cache 45 or not (step 105, FIG. 11). When that data indicating where the input surface is stored is not present (a cache miss), the required data indicating where the input surface data is stored is fetched into the surface cache 45 (step 106, FIG. 11).

When the required data indicating where the input surface to be displayed for the segment is stored is in the surface cache 45, the address and length of the pixel data in the input surface to be fetched for the segment is calculated (step 107, FIG. 11), i.e. using the line position, the segment position and the segment length, and the pixel data is fetched from that address (step 108, FIG. 11).

Alternatively, when the segment is blank, the null code is read and no data to be displayed for an input surface needs to be obtained, i.e. the compositing display controller 25 knows to set this part of the secondary surface to be transparent or a default colour.

Once the pixel data for the input surface for the region (segment) of the secondary surface in question has been fetched, that data can then be read into the input FIFO 38, 39 of the hardware module 32, 33 for the secondary surface in question and provided therefrom to the composition block 40 of the compositing display controller 25 for composition with other surfaces, such as another secondary surface from the hardware module 33 and a further input surface from the hardware module 34, to provide the overall composited output surface for the pixel position(s) in question. This composition process may, as is known in the art, comprise blending or otherwise combining the secondary surface and/or input surface or surfaces. The composited output surface pixel is then provided to the display for display.

This process is repeated for all the segments of all the lines in the secondary surface until all the pixel data for the secondary surface has been composited.

In detail, this is done by determining if all the segments in the line in question have been processed (step 109, FIG. 11) and if not, the next segment is processed (step 110, FIG. 11), i.e. by repeating steps 105-108 of FIG. 11.

Once all the segments in the line have been processed, it is determined if all the lines in the secondary surface have been processed (step 111, FIG. 11) and if not, it is determined if the line is a repeat of the previous line (step 112, FIG. 11), i.e. from the repeat counter 54 in the header data entry 50. When the line is a repeat, the steps for the line (steps 105-111, FIG. 11) are repeated, by starting at the first segment in the line (step 113, FIG. 11). It will be noted that when the line is repeated, the required input surface data will generally already be present in the surface cache 45, so step 106 may not be required. Likewise, the required line data structure 53 will generally already be present in the line segment buffer 46 and thus may not need to be re-fetched.

These steps are repeated for however many times the repeat counter 54 specifies, i.e. until step 112 determines that the line is not repeated. For the new line (step 114, FIG. 11), a new line data structure 53 is required to be fetched into the line segment buffer 46 (step 104, FIG. 11), and then steps 105-110 can be repeated as necessary for the segments in the new line. Again, it is determined if this line is repeated or not (step 112, FIG. 11), until it is determined that all the lines in the secondary surface have been processed (step 111, FIG. 11). At this point, the processing of the secondary surface is complete (step 115, FIG. 11).

The secondary surface is then combined with other input surfaces by the display controller 25. In the display frame 10 shown in FIG. 1, the secondary surface which is formed from input surfaces 1 and 4 is alpha-blended with input surfaces 2 and 3, i.e. the top portion which is covered by input surface 1, with overlapping input surfaces 2 and 3 themselves being alpha-blended with each other, in order to form the display frame 10 which is then sent via the display interface 29 to the display 19.

The whole process will then be repeated for the next output frame as necessary. (All buffers and caches are invalidated for each frame.)

A further example of the operation of producing of a secondary surface, will now be described with reference to the group of input surfaces 71, 72, 73, 74, 75 which have been selected to be suitable for combining into a secondary surface 70 shown in FIG. 9a (i.e. according to the process described with reference to FIGS. 10a and 10b), inter alia with reference to FIGS. 9a, 9b, 10c and 11.

To generate the secondary surface 70 shown in FIG. 9a, the driver 140 for the compositing display controller 25 determines which and how the input surfaces 71, 72, 73, 74, 75, are to contribute to the secondary surface 70, i.e. determines the relative positioning of the input surfaces 71, 72, 73, 74, 75 with respect to each other, both in the plane of the secondary surface 70 and the depth order within it. This is done by splitting up the secondary surface 70 into separate lines 76, as shown in FIG. 9b, and as will be described with reference to FIG. 10c.

For each line 76 of the secondary surface 70, starting with the first vertical line in the secondary surface 70 (step 219, FIG. 10c) the driver for the compositing display controller 25 determines which of the input surfaces 71, 72, 73, 74, 75 is to be used to form the secondary surface for all the points along the line, as well as if there are any points for which no input surface is to be used to form the secondary surface, e.g. the secondary surface is blank and transparent.

Starting from the first horizontal pixel in this line (step 220, FIG. 10c), of the input layers 71, 72, 73, 74, 75 remaining in the updated layer list, the foremost input surface (in screen space) is determined for that pixel (step 221, FIG. 10c). The input surface for that pixel is compared with the input surface for the previous pixel to see if they are different (step 222, FIG. 10c). When the pixels have the same input surface, then the driver determines when the end of the horizontal line has been reached (step 224, FIG. 10c). If not, the horizontal co-ordinate is incremented (step 225, FIG. 10c) and the next pixel is considered as to its foremost input surface (i.e. repeating step 221, FIG. 10c).

When adjacent pixels have a different input surface, i.e. the end of a segment has been reached, a data entry 53 containing an entry 55 for the previously considered segment, indicating the length 57 of the segment and the input surface 56 to be displayed for that segment or that the segment is blank (e.g. using a null code), is written out to appropriate storage by the driver (step 223, FIG. 10c).

Once the end of the horizontal line has been reached, the driver determines when the end of the vertical line has been reached, i.e. have all the horizontal lines been considered (step 226, FIG. 10c). If not, the vertical co-ordinate is incremented (step 227, FIG. 10c) and the next horizontal line is considered (i.e. reverting to step 220, FIG. 10c). Once all the vertical lines have been considered, the data structure is complete (step 228, FIG. 10c).

As generally an input surface 71, 72, 73, 74, 75 will be used to form the secondary surface for a number of consecutive points along a line 76 across the secondary surface 70, the line 76 can be divided into segments 78, 79 for which the same input surface 71, 72, 73, 74, 75 is used to form the secondary surface and segments 80 which are blank. Taking one of the lines 77 as an example (see FIG. 9b), it can be seen that the visible secondary surface 70 comprises a blank segment 80, followed by a segment 78 in which one of the input surfaces 71 is used to form the secondary surface, followed by another blank segment 80, followed by a segment 79 in which another of the input surfaces 74 is used to form the secondary surface, and finished by a blank segment 80.

The driver for the compositing display controller 25 determines the segment information for each line 76 of the secondary surface 70, from the surface attribute information, i.e. the size, position and ordering of the input surfaces, as shown in FIG. 7b, which are supplied to the driver by the GPU 24. The segment information for each line 76 is then written out by the driver to memory from where it can be ready by the hardware module 32 of the compositing display controller 25 and stored in the line segment buffer 46 in the format shown in FIG. 6, i.e. for each line, a separate data entry 53 contains an entry 55 for each segment that indicates the length 57 of the segment and the input surface 56 to be displayed for that segment or if the segment is blank (e.g. using a null code).

Along with a "line segment" data entry 53 for each line 76 being written out by the driver, a "header" data entry 50 for the secondary surface 70, as shown in FIG. 5, is also written out and stored. To determine the information to write out into this data entry 50, the driver of the compositing data controller 25 has to determine if the layout of a line is identical to that of a previous line, i.e. will the segment information be the same, and if so, how many times is the layout repeated. This results in the data entry 50 for the secondary surface 70 being able to be written as a series of repeat counters 54 and line pointers 52 to the data entries 53 for each line 76, such that a line pointer 52 can be followed the correct number of repeated times.

In the example secondary surface 70 shown in FIG. 9a it can be seen that the fourth and fifth lines 76 are repeated, along with the penultimate two lines. However, generally a secondary surface, with the compositing lines being a single sampling point or pixel wide, rather than the very thick lines shown in FIG. 9a for the purpose of illustration, may have many repeated lines.

Once the data structures for the secondary surface have been generated and stored, i.e. the data structures 58, 63 for the input surfaces 71, 72, 73, 74, 75, the data entry 50 for the secondary surface 70 and the data entries 53 for each line 76, the output surface can be composited using the secondary surface 70. This will now be described with reference to FIG. 11.

First, the drawing of a new output surface (frame) is initiated (step 101, FIG. 11).

To determine the pixel data to be used for the secondary surface 70 when compositing the output surface, the "header" data entry 50 for the secondary surface 70 is fetched into the header buffer 44 (step 102, FIG. 11). In the "header" data entry 50, the line pointer 52 for the first line (line 0) is followed (step 103, FIG. 11) to retrieve the data entry 53 for the first line, containing entries 55 for each segment 55 to be displayed along the line 76. This data entry 53 is fetched into the line segment buffer 46 (step 104, FIG. 11).

Starting at the first segment (segment 0) of the first line (line 0), the surface cache 45 is queried as to whether the data indicating where the input surface to be displayed for that segment 78 is stored (i.e. the input surface with the surface ID 56 specified in bits 0 to 6 of the data entry 55 for the first segment of the data entry 53 for the first line), is present in the cache 45 or not (step 105, FIG. 11). When that data indicating where the input surface is stored is not present (a cache miss), the required data indicating where the input surface data is stored is fetched into the surface cache 45 (step 106, FIG. 11).

When the required data indicating where the input surface to be displayed for the segment 78 is stored is in the surface cache 45, the address and length of the pixel data in the input surface to be fetched for the segment is calculated (step 107, FIG. 11), i.e. using the line position, the segment position and the segment length, and the pixel data is fetched from that address (step 108, FIG. 11).

Alternatively, when the segment is blank, the null code is read and no data to be displayed for an input surface needs to be obtained, i.e. the compositing display controller 25 knows to set this part of the secondary surface to be transparent or a default colour.

Once the pixel data for the input surface for the region (segment) of the secondary surface in question has been fetched, that data can then be read into the input FIFO 38, 39 of the hardware module 32, 33 for the secondary surface in question and provided therefrom to the composition block 40 of the compositing display controller 25 for composition with other surfaces, such as another secondary surface from the hardware module 33 and a further input surface from the hardware module 34, to provide the overall composited output surface for the pixel position(s) in question. This composition process may, as is known in the art, comprise blending or otherwise combining the secondary surface and/or input surface or surfaces. The composited output surface pixel is then provided to the display for display.

This process is repeated for all the segments 78, 79, 80 of all the lines 76 in the secondary surface 70 until all the pixel data for the secondary surface has been composited.

In detail, this is done by determining if all the segments 78 in the line in question have been processed (step 109, FIG. 11) and if not, the next segment is processed (step 110, FIG. 11), i.e. by repeating steps 105-108 of FIG. 11.

Once all the segments in the line have been processed, it is determined if all the lines in the secondary surface 70 have been processed (step 111, FIG. 11) and if not, it is determined if the line is a repeat of the previous line (step 112, FIG. 11), i.e. from the repeat counter 54 in the header data entry 50. When the line is a repeat, the steps for the line (steps 105-111, FIG. 11) are repeated, by starting at the first segment in the line (step 113, FIG. 11). It will be noted that when the line is repeated, the required input surface data will generally already be present in the surface cache 45, so step 106 may not be required.

These steps are repeated for however many times the repeat counter 54 specifies, i.e. until step 112 determines that the line is not repeated. For the new line (step 114, FIG. 11), a new line data structure 53 is required to be fetched into the line segment buffer 46 (step 104, FIG. 11), and then steps 105-110 can be repeated as necessary for the segments in the new line. Again, it is determined if this line is repeated or not (step 112, FIG. 11), until it is determined that all the lines 76 in the secondary surface 70 have been processed (step 111, FIG. 11). At this point, the processing of the secondary surface is complete (step 115, FIG. 11).

The secondary surface is then combined with any other input surfaces which are to form the display frame but which were not selected to form the secondary surface, by the display controller 25. The display frame is then sent via the display interface 29 to the display 19.

The whole process will then be repeated for the next output frame as necessary. (All buffers and caches are invalidated for each frame.)

In the above embodiment, particular data structures describing the layout of the input surfaces within the secondary surface are provided to the composition process.

In another embodiment, rather than providing such data structures detailing the layout of the input surfaces within the secondary surface, instead data simply indicating the input surfaces that are to contribute to the secondary surface and where the input surface data is stored is provided to the composition process. This arrangement may be used in particular where, for example, the secondary surface is formed from completely non-overlapping input surfaces.

In this embodiment, the basic configuration of the compositing display controller 25 is as shown in FIG. 3. However, each hardware module 32, 33 that can handle a secondary surface has a slightly different configuration to that described in relation to the above embodiment.

Figure 12:
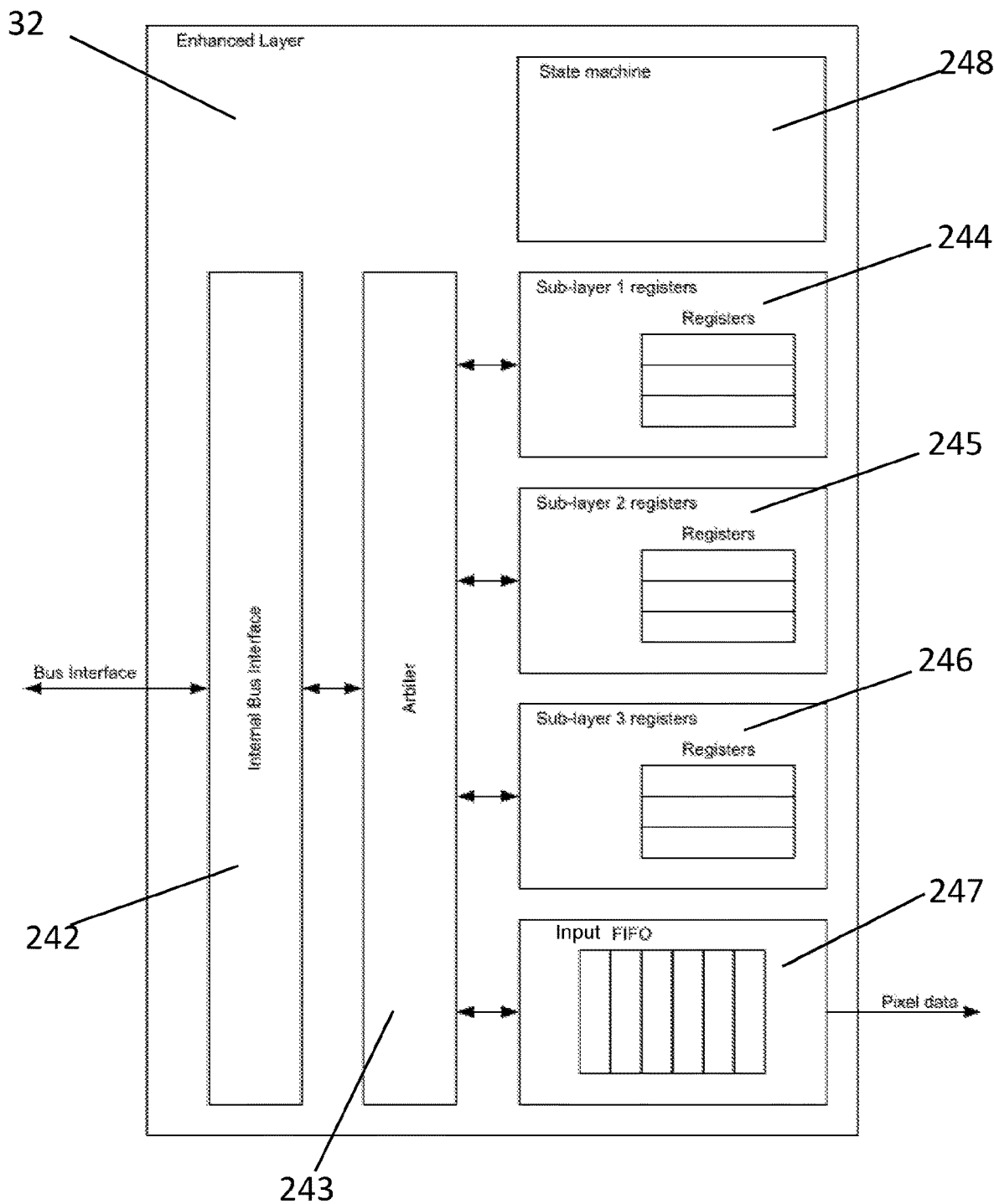
FIG. 12 shows schematically a hardware module of the compositing display controller that can operate in accordance with another embodiment of the technology described herein.

FIG. 12 shows schematically an exemplary hardware module 32 or 33 of the compositing display controller 25 that can operate in accordance with this embodiment of the technology described herein.

As shown in FIG. 12, in this embodiment the hardware module 32 comprises an internal bus interface 242 which communicates with the display controller's bus interface 30 (as shown in FIG. 3) to read in data for the input surfaces which are to contribute to the secondary surface.

The secondary surface handling hardware module 32 also includes a plurality of input surface (sub-layer) registers 244, 245 and 246. These registers are used to store data indicating where the input surfaces that the secondary surface is to be formed from are stored, in the form of pointers to the input surface data in memory and other indications, such as the size of the input surface in memory.

The internal bus interface 242 is also in data communication with an arbiter 243 of the hardware module 32 which determines how the input surfaces are to be formed into the secondary surface.

The arbiter 243 determines which input surface is to be used for any given region of the secondary surface, fetches the input surface pixel data, and provides the corresponding pixel data to an input FIFO 247 for outputting to the composition block 40 of the display controller 25 (as shown in FIG. 3).

The hardware module 32 also comprises a state machine 248 which is arranged to control the operation of the hardware module.

Operation of this embodiment of the technology described herein will now be described with reference to FIGS. 1, 8 and 12 to 14.

Figure 13A:
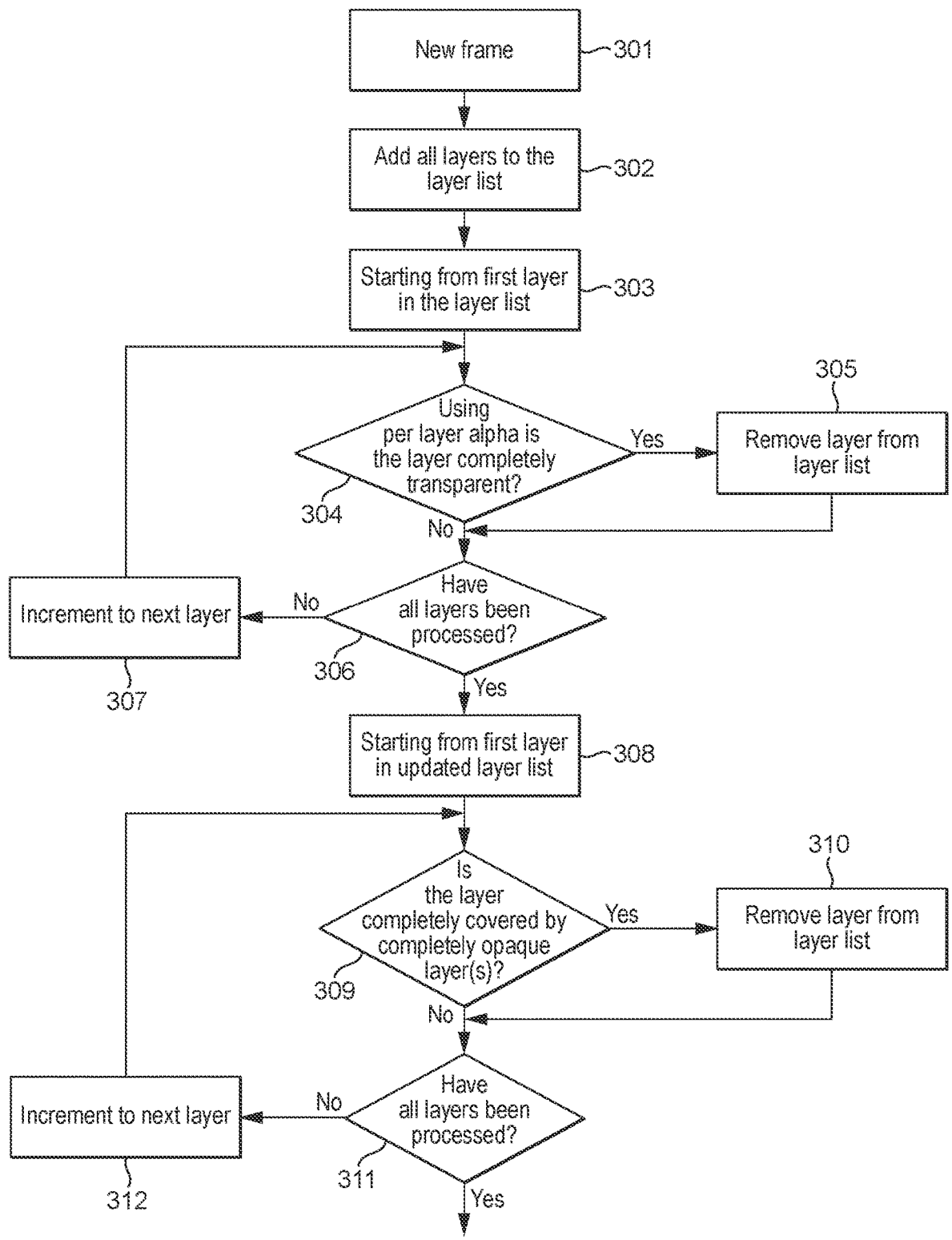
FIGS. 13a and 13b show a flowchart illustrating the operation of the system according to the embodiment shown in FIG. 12.

Again, to produce a composited output frame (step 301, FIG. 13a), the driver of the compositing display controller 25 first uses the attribute information of the input surfaces that are to be composited to create a "layer list" of the input surfaces (step 302, FIG. 13a).

Starting with the first input surface in the layer list (step 303, FIG. 13a), the alpha value for that input surface is used to determine when the input surface is completely transparent, i.e. when alpha equals 0 (step 304, FIG. 13a). This is straightforward to determine when the alpha value of an input surface is set for the whole of the input surface, for example. Thus in more complex situations, e.g. when the alpha value is stored per pixel, this step may be skipped. When the input surface is completely transparent it is discarded from the layer list (step 305, FIG. 13a), otherwise it is retained in the layer list.

The driver 140 then checks whether or not all the input surfaces in the layer list have been considered (step 306, FIG. 13a) and, if not, the next input surface in the layer list is processed (step 307, FIG. 13a), with its alpha value being used to determine when the input surface is completely transparent (step 303, FIG. 13a). This continues until all the input surfaces in the layer list have been considered by the driver.

At this stage the driver 140 now has an updated layer list which does not include any completely transparent input surfaces. Starting from the first input surface in the updated layer list (step 308, FIG. 13a), the size and position of that input surface, along with the size, position and alpha values for the other input surfaces in the updated layer list are used by the driver 140 to determine when the first input surface is completely covered by completely opaque input surfaces (step 309, FIG. 13a). When the input surface is completely obscured it is discarded from the layer list (step 310, FIG. 13a), otherwise it is retained in the layer list.

The driver 140 then checks whether or not all the input surfaces in the layer list have been considered (step 311, FIG. 13a) and, if not, the next input surface in the layer list is processed (step 312, FIG. 13a), to determine whether or not it is completely covered by other opaque input surfaces (step 309, FIG. 13a). This continues until all the input surfaces in the updated layer list have been considered by the driver.

At this stage the driver 140 now has a further updated layer list which does not include any completely transparent input surfaces or input surfaces which are completely obscured by other opaque input surfaces. Starting from the first input surface in the updated layer list (step 313, FIG. 13b), the size and position of that input surface, along with the size, position and for the other input surfaces in the updated layer list are used by the driver 140 to determine when the first input surface overlaps any of the other input surfaces (step 314, FIG. 13*b*). When the input surface being considered does not overlap any of the other input surfaces it is added to a list of input surfaces to use to form a secondary surface (the "smart layer") and is removed from the "layer list" of the input surfaces being processed for consideration in the secondary surface (step 315, FIG. 13*b*).

Figure 13B:
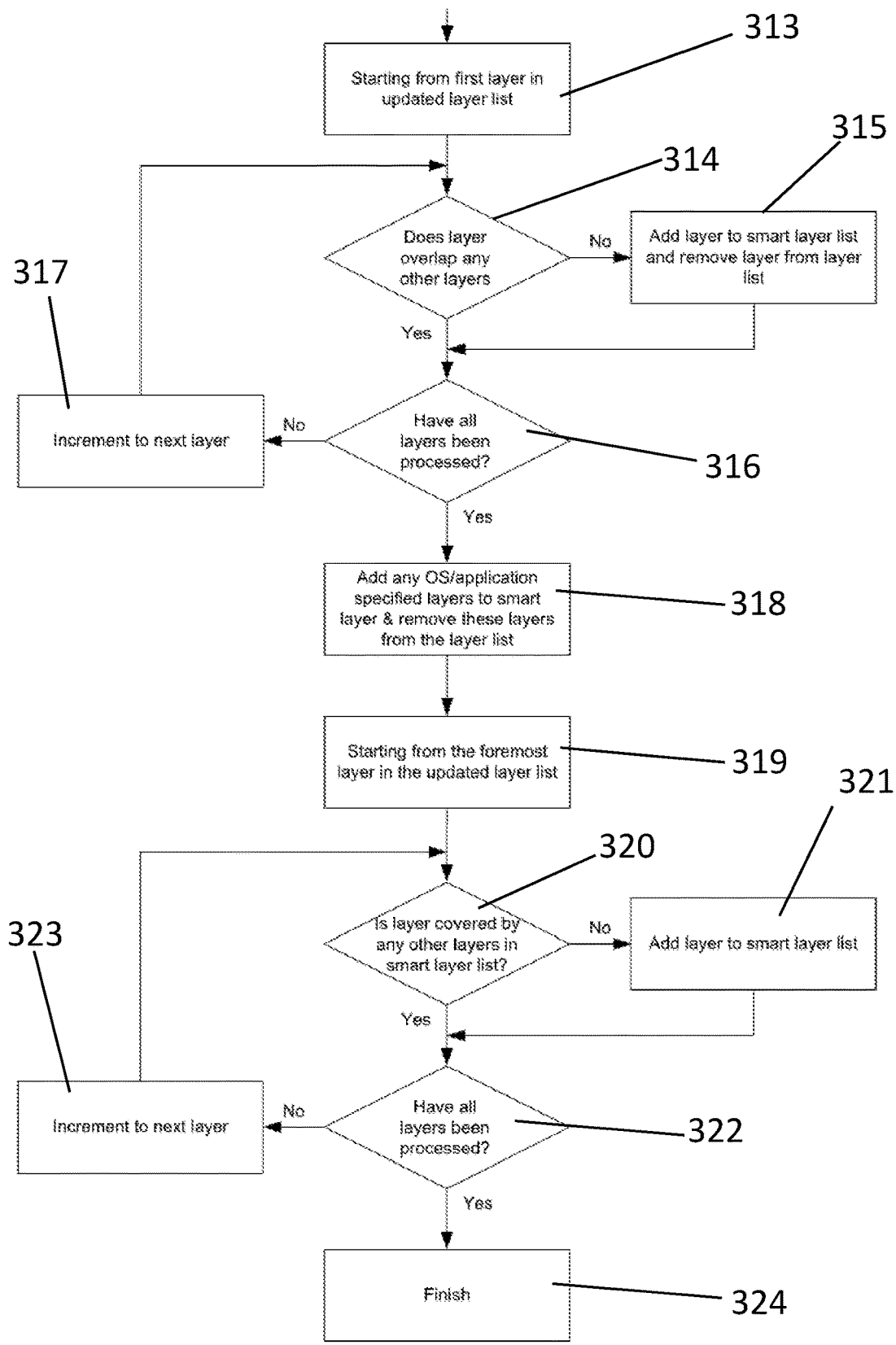

The driver 140 then checks whether or not all the input surfaces in the layer list have been considered (step 316, FIG. 13*b*) and, if not, the next input surface in the layer list is processed (step 317, FIG. 13*b*), to determine whether or not it overlaps any of the other input surfaces (step 314, FIG. 13*b*). This continues until all the input surfaces in the updated layer list have been considered by the driver 140, at the end of which a "smart layer", secondary surface list has been started to be formed of all the input surfaces which do not overlap any other input surfaces.

The next step in the process is that any input layers that have been specified by an application or the operating system to be included in the secondary surface are added to the "smart layer" list and removed from the "layer list" (step 318, FIG. 13*b*).

Now considering the updated layer list of the input surfaces, starting from the foremost input surface in the updated layer list (step 319, FIG. 13*b*), the size, position and depth order of that input surface, along with the size, position and depth order of the other input surfaces that have been added previously to the "smart layer" secondary surface list are used by the driver to determine when the foremost input surface is covered by any of the other input surfaces in the "smart layer" list (step 320, FIG. 13*b*). When the input surface being considered is not covered by any of the other input surfaces already in the "smart layer" secondary surface list it is added to a list of input surfaces to use to form the secondary surface (the "smart layer") (step 321, FIG. 13*b*).

The driver then checks whether or not all the input surfaces in the updated layer list have been considered (step 322, FIG. 13*b*) and, if not, the next input surface (by depth) in the layer list is processed (step 323, FIG. 13*b*), to determine whether or not it is covered by any of the other input surfaces in the updated "smart layer" secondary surface list (step 320, FIG. 13*b*). This continues until all the input surfaces in the updated layer list have been considered by the driver, at the end of which a "smart layer" secondary surface list has been formed of all the input surfaces which do not overlap any other input surfaces (step 324, FIG. 13*b*).

(It can be seen that in the case of the input surfaces shown in FIG. 1, this process will result in the "smart layer" secondary surface list containing input surfaces 1 and 4, as input surface 4 does not overlap any of the other input surfaces 1, 2, 3, and input surface 1 is the foremost input surface and is not covered by input surface 4. Input surfaces 2 and 3 are covered by input surface 4 so these input surfaces 2, 3 are not added to the "smart layer" list.) (It will be appreciated that input surfaces 2 and 4, or 3 and 4 could alternatively have been selected to be included in the updated layer list, if the ordering of the input surfaces 1, 2, 3, 4 on the initial layer list had been different.)

At this stage the "smart layer" list now contains the input surfaces which are suitable for combining into the secondary surface. The process of compositing of an output surface using the secondary surface formed from input surfaces 1 and 4 in FIG. 1 will now be described, inter alia, with reference to FIGS. 1, 12 and 14.

First, the composition of a new output frame (or window thereof) is initiated (step 401, FIG. 14), i.e. in other words the output surface is to be composited. Using the list of the input surfaces 1, 4 for the secondary surface prepared by the driver, the input surfaces are ordered by the horizontal co-ordinate of their left edge, the first input surface in the ordered list having the smallest horizontal co-ordinate (step 402, FIG. 14). In FIG. 1 the input surfaces 1, 4 are therefore ordered 1, 4 (arbitrarily choosing surface 1 first even though input surfaces 1 and 4 have the same smallest horizontal co-ordinate).

Data indicating where the data for the determined input surfaces is stored is then loaded into the registers 244, 245, 246 of the hardware module 32 in the determined order of their left-edges (so data for the left-most surface 1 is loaded into the first register 244 and, so on).

Figure 14:
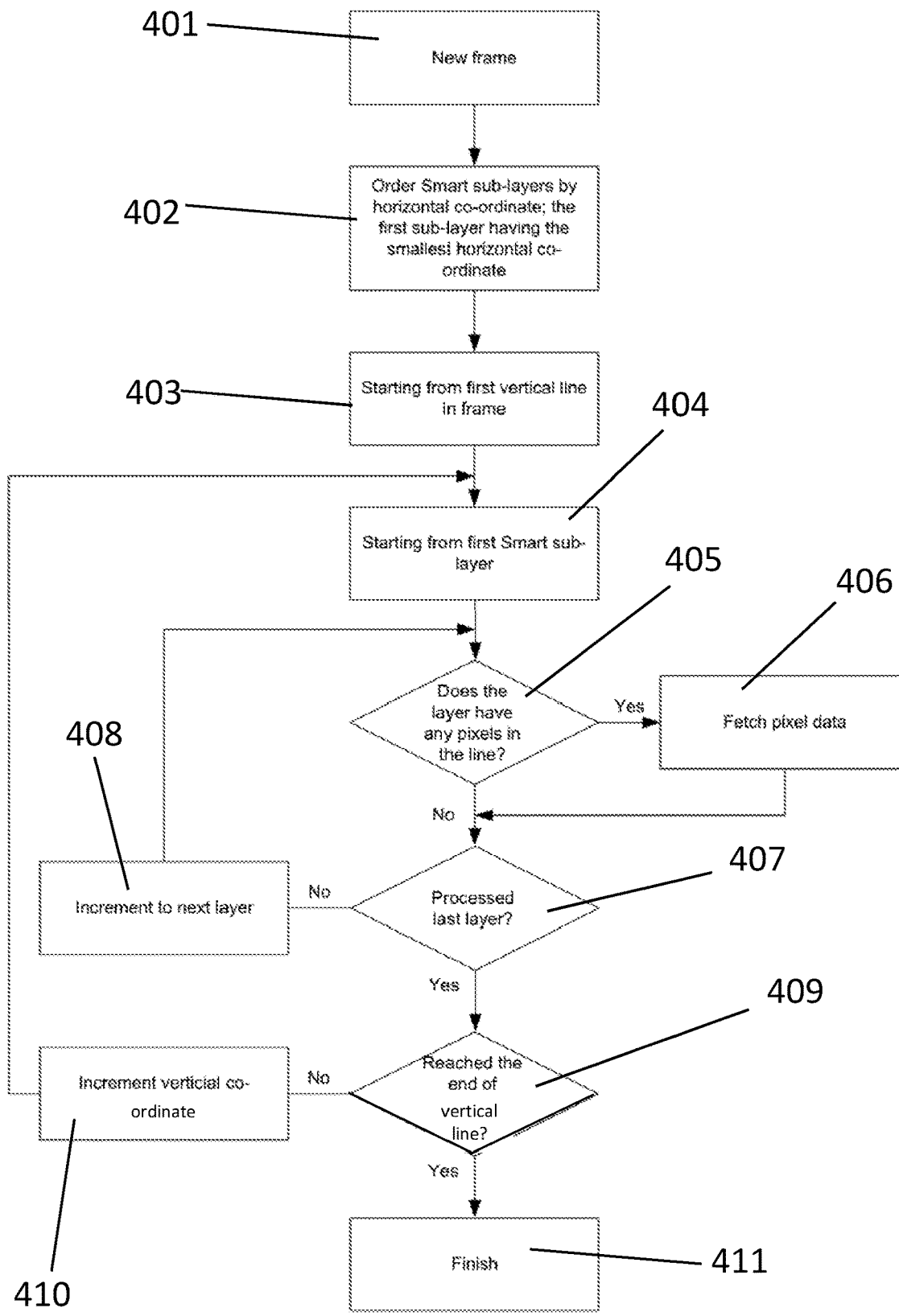
FIG. 14 shows a flowchart illustrating the operation of the display controller according to the embodiment shown in FIG. 12.

To form the secondary surface, the first vertical co-ordinate in the frame is considered by the arbiter 243 (step 403, FIG. 14) and the first input surface in the ordered "smart layer" list is considered (step 404, FIG. 14). If that input surface has any pixels in the horizontal line of the first vertical co-ordinate (step 405, FIG. 14) (it can be seen that input surface 1 in FIG. 1 has pixels for the whole of the horizontal line running from the first vertical co-ordinate) then the pixel data for this input surface is fetched using the data in the respective register 244 (step 406, FIG. 14).

The arbiter 243 then determines if the last input surface in the ordered "smart layer" list has been processed (step 407, FIG. 14). If not, the next input surface in the ordered "smart layer" list is considered (step 408, FIG. 14). The arbiter 243 then determines if the next input surface horizontally has any pixels in the horizontal line (step 405, FIG. 14) until all the input layers in the "smart layer" secondary surface list have been processed (it can be seen that only input surfaces 1 in FIG. 1 has any pixels in the horizontal line running from the first vertical coordinate).

Once all the input surfaces in the "smart layer" secondary surface list have been considered for the first vertical co-ordinate, it is determined if the end of the vertical line has been reached, i.e. the bottom of the frame (step 409, FIG. 14). If not, the vertical co-ordinate is increased (step 410, FIG. 14) in order to consider the next horizontal line across the frame.

This is repeated until all the horizontal lines have been considered (until the end of the vertical line is reached), when the frame is finished (step 411, FIG. 14).

In this manner it will be seen that input surfaces 1 and then 4 in FIG. 1 will be reached (input surface 4 being reached after a gap of a number of intermediate horizontal lines) and the pixel data for them fetched and provided by the arbiter 243 to the composition block 40 (which will combine the secondary surface with other secondary surfaces and/or remaining input surfaces as appropriate, i.e. combining the secondary surface formed from input surfaces 1 and 4 in FIG. 1 with input surfaces 2 and 3 using alpha blending).

A further example of the operation of compositing an output surface using a secondary surface, will now be described with reference to FIG. 8 which shows another exemplary group of input surfaces 66, 67, 68 that have been selected by the above criteria to be suitable for combining into a secondary surface 65 (i.e. according to the process described with reference to FIGS. 13*a* and 13*b*). The composition of an output surface using the secondary surface 65 comprising these input surfaces 66, 67, 68, will now be described, inter alia, with reference to FIGS. 8, 12 and 14.

First, the composition of a new output frame (or window thereof) is initiated (step 401, FIG. 14), i.e. in other words the output surface is to be composited. Using the list of the input surfaces for the secondary surface prepared by the driver, the input surfaces are ordered by the horizontal co-ordinate of their left edge, the first input surface in the ordered list having the smallest horizontal co-ordinate (step 402, FIG. 14). In FIG. 8 the input surfaces 66, 67, 68 are therefore ordered 68, 66, 67.

Data indicating where the data for the determined input surfaces is stored is then loaded into the registers 244, 245, 246 of the hardware module 32 in the determined order of their left-edges (so data for the left-most surface 68 is loaded into the first register 244 and, so on).

To form the secondary surface 65, the first vertical co-ordinate in the frame is considered by the arbiter 243 (step 403, FIG. 14) and the first input surface in the ordered "smart layer" list is considered (step 404, FIG. 14). If that input surface has any pixels in the horizontal line of the first vertical co-ordinate (step 405, FIG. 14) (it can be seen that input surface 68 in FIG. 8 does not have any pixels in the horizontal line running from the first vertical co-ordinate) then the pixel data for this input surface is fetched using the data in the respective register 244 (step 406, FIG. 14).

The arbiter 243 then determines if the last input surface in the ordered "smart layer" list has been processed (step 407, FIG. 14). If not, the next input surface in the ordered "smart layer" list is considered (step 408, FIG. 14). The arbiter 243 then determines if the next input surface horizontally has any pixels in the horizontal line (step 405, FIG. 14) until all the input layers in the "smart layer" secondary surface list have been processed (it can be seen that neither of the other input surfaces 66, 67 in FIG. 8 have any pixels in the horizontal line running from the first vertical co-ordinate).

Once all the input surfaces in the "smart layer" secondary surface list have been considered for the first vertical co-ordinate, it is determined if the end of the vertical line has been reached, i.e. the bottom of the frame (step 409, FIG. 14). If not, the vertical co-ordinate is increased (step 410, FIG. 14) in order to consider the next horizontal line across the frame.

This is repeated until all the horizontal lines have been considered (until the end of the vertical line is reached), when the frame is finished (step 411, FIG. 14).

In this manner it will be seen that eventually input surfaces 67, then 66 and then 68 in FIG. 8 will be reached and the pixel data for them fetched and provided by the arbiter 243 to the composition block 40 (which will combine the secondary surface 65 with other secondary surfaces and/or remaining input surfaces as appropriate, e.g. using alpha blending).

Figure 15:
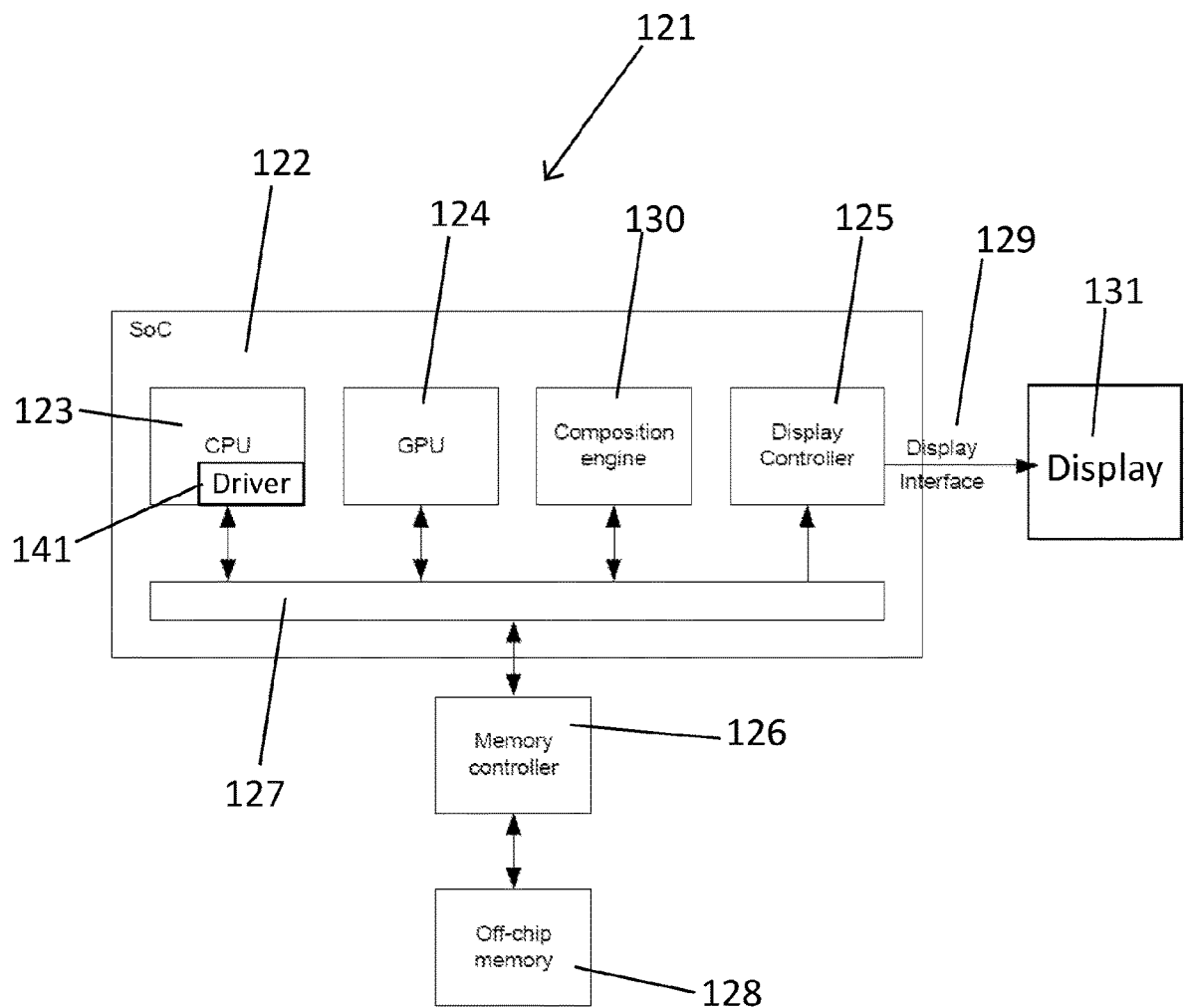
FIG. 15 shows schematically a further data processing system that can operate in accordance with the described embodiments of the technology described herein.

FIG. 15 shows schematically another exemplary data processing system 121 to that shown in FIG. 2, that can also operate in the manner of the present embodiments.

The data processing system 121 shown in FIG. 15 again comprises a CPU 123, and a GPU 124, that communicate via an interconnect 127, on a system on-chip 122, all having access to off-chip memory 128 via a memory controller 126. However, in this case, the data processing system 121 comprises a composition engine 130 and a separate display controller 125, instead of a combined compositing display controller. As in the data processing system 21 of FIG. 2, for the data processing system 121 of FIG. 15, the display controller 125 has a display interface 129 for communicating with a display 131. A driver 141 for the composition engine runs on the CPU 123.

Operation of the embodiment shown in FIG. 15 is very similar to the operation described above, with reference to FIGS. 2-14, for the embodiment of FIG. 2. The only difference is that the separate composition engine 130 processes and composites the secondary and input surfaces, and then writes the composited output surface to a frame buffer in the memory 128, from where the display controller 125 fetches it for display.

Variations and modifications to the above described processes would be possible. For example, it is not necessary to detect and remove completely transparent or completely covered layers (input surfaces), and/or those processes may be performed elsewhere. Furthermore, a different set or order of the steps to determine the input surfaces which contribute to the secondary surface may be used.

The input, secondary and/or output surface may be compressed, rotated, and/or scaled, etc.

It can be seen from the above, that in its embodiments at least, the technology described herein comprises an arrangement in which plural input surfaces can be composited into an output surface whilst requiring fewer hardware resources. It is also able to composite input surfaces which may be overlapping and/or of any arbitrary shape.

This is achieved in the embodiments of the technology described herein at least, by combining some or all of the input surfaces to be composited into an intermediate secondary surface which is then provided to the composition process/processor. This avoids the need for the composition process/processor to have to handle those input surfaces independently of each other. Multiple input surfaces can be combined into an intermediate secondary surface, e.g. determined on a line by line basis, such that the composition process requires no knowledge of the overall arrangement of the input surfaces across the whole of the secondary surface.

A secondary surface may be formed from a large number of input surfaces which may be overlapping and of any shape and layout. Methods and systems of the technology described herein may thus able to accommodate any arbitrary number of input surfaces, any shape of input surface, as well as input surfaces which overlap, etc.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical application, to thereby enable others skilled in the art to best utilise the technology described herein in various embodiments and with various modifications as are suited to the particular use contemplated. It is intended that the scope of the technology described herein be defined by the claims appended hereto.

What is claimed is:

1. A method comprising:
when an output surface for display is to be composited from a plurality of input surfaces by a composition processor:
determining whether two or more input surfaces of the plurality of input surfaces can be combined into a single secondary surface for provision to the composition processor; and
when it is determined that two or more input surfaces of the plurality of input surfaces can be combined into a single secondary surface for provision to the composition processor:
determining, for each of one or more segments along one or more lines of two or more groups of one or more lines traversing the secondary surface, which of the two or more of the plurality of input surfaces is to contribute to the secondary surface at the segment along the one or more lines of the two or more groups;

generating data representing the secondary surface, which data comprises an identification, for each of the one or more segments along the one or more lines of the two or more groups of one or more lines traversing the secondary surface, of the input surface that is to contribute to the secondary surface at the segment along the one or more lines of the two or more groups, and an indication of the arrangement of the one or more segments along the one or more lines of the two or more groups within the secondary surface; and providing, to the composition processor, for each of at the segment along the one or more lines of the two or more groups traversing the secondary surface, the identification of the input surface that is to contribute to the secondary surface at the segment along the one or more lines of the two or more groups, and the indication of the arrangement of the one or more segments along the one or more lines of the group within the secondary surface.

2. A method as claimed in claim 1, wherein the step of determining whether the input surfaces can be combined into a secondary surface comprises determining whether any of the input surfaces of the plurality of input surfaces do not overlap each other.

3. A method as claimed in claim 1, wherein the step of determining whether the input surfaces can be combined into a secondary surface comprises determining for input surfaces of the plurality of input surfaces that at least partly overlap, whether the foremost input surface in screen space of the determined overlapping input surfaces is opaque where the surfaces overlap.

4. A method as claimed in claim 1, wherein one or more attributes of the plurality of input surfaces is used to determine whether any of the input surfaces can be combined to form a secondary surface, and/or which of the input surfaces should be combined to form a secondary surface.

5. A method as claimed in claim 1, comprising compositing the output surface using at least the secondary surface, wherein the step of compositing the output surface using at least the secondary surface comprises fetching data to be used to form the secondary surface from the input surfaces identified by the data identifying the input surfaces that contribute to the secondary surface.

6. A method as claimed in claim 1, wherein the data identifying the input surfaces that contribute to a secondary surface that is provided to the composition processor comprises data indicating where the data for the input surface in question is stored.

7. A method as claimed in claim 1, wherein the identification of the input surface that is to contribute to the secondary surface at the one or more segments along the one or more lines of the two or more groups comprises a first data entry comprising a pointer for the group of one or more lines that points to a set of second data entries for the group of one or more lines, within each second data entry then comprising information identifying the input surface that is to be used for the secondary surface at a respective segment of the group of lines.

8. A method as claimed in claim 7, wherein each second data entry comprises information representative of the length of the segment.

9. An apparatus comprising processing circuitry capable of:

when an output surface for display is to be composited from a plurality of input surfaces by a composition processor:

determining whether two or more input surfaces of the plurality of input surfaces can be combined into a single secondary surface for provision to the composition processor; and when it is determined that two or more input surfaces of the plurality of input surfaces can be combined into a single secondary surface for provision to the composition processor:

determining, for each of one or more segments along one or more lines of two or more groups of one or more lines traversing the secondary surface, which of the two or more of the plurality of input surfaces is to contribute to the secondary surface at the segment along the one or more lines of the two or more groups;

generating data representing the secondary surface, which data comprises an identification, for each of the one or more segments along the one or more lines of the two or more groups of one or more lines traversing the secondary surface, of the input surface that is to contribute to the secondary surface at the segment along the one or more lines of the two or more groups, and an indication of the arrangement of the one or more segments along the one or more lines of the two or more groups within the secondary surface; and providing, to the composition processor, for each of at the segment along the one or more lines of the two or more groups traversing the secondary surface, the identification of the input surface that is to contribute to the secondary surface at the segment along the one or more lines of the two or more groups, and the indication of the arrangement of the one or more segments along the one or more lines of the group within the secondary surface.

10. An apparatus as claimed in claim 9, wherein the processing circuitry is capable of determining whether any of the input surfaces of the plurality of input surfaces do not overlap each other.

11. An apparatus as claimed in claim 9, wherein the processing circuitry is capable of determining, for input surfaces of the plurality of input surfaces that at least partly overlap, whether the foremost input surface in screen space of the determined overlapping input surfaces is opaque where the surfaces overlap.

12. An apparatus as claimed in claim 9, wherein one or more attributes of the plurality of input surfaces is used by the processing circuitry to determine whether any of the input surfaces can be combined to form a secondary surface, and/or which of the input surfaces should be combined to form a secondary surface.

13. An apparatus as claimed in claim 9, further comprising a composition processor and wherein the composition processor is capable of compositing an output surface using at least a secondary surface, wherein, to composite an output surface using at least a secondary surface, the composition processor is capable of fetching data to be used to form the secondary surface from the input surfaces identified by the data identifying the input surfaces that contribute to the secondary surface.

14. An apparatus as claimed in claim 9, wherein the data identifying the input surfaces that contribute to a secondary surface that is provided to the composition processor comprises data indicating where the data for the input surface in question is stored.

15. An apparatus as claimed in claim 9, wherein the identification of the input surface that is to contribute to the secondary surface at the one or more segments along the one or more lines of the two or more groups comprises a first data entry comprising a pointer for the group of one or more lines that points to a set of second data entries for the group of one or more lines, within each second data entry then comprising information identifying the input surface that is to be used for the secondary surface at a respective segment of the group of lines.

16. An apparatus as claimed in claim 15, wherein each second data entry comprises information representative of the length of the segment.

17. A non-transient computer readable storage medium storing computer software code which when executing on a processor performs a method comprising:
  when an output surface for display is to be composited from a plurality of input surfaces by a composition processor:
    determining whether two or more input surfaces of the plurality of input surfaces can be combined into a single secondary surface for provision to the composition processor; and
    when it is determined that two or more input surfaces of the plurality of input surfaces can be combined into a single secondary surface for provision to the composition processor:
      determining, for each of one or more segments along one or more lines of two or more groups of one or more lines traversing the secondary surface, which of the two or more of the plurality of input surfaces is to contribute to the secondary surface at the segment along the one or more lines of the two or more groups;
      generating data representing the secondary surface, which data comprises an identification, for each of the one or more segments along the one or more lines of the two or more groups of one or more lines traversing the secondary surface, of the input surface that is to contribute to the region of the secondary surface at the segment along the one or more lines of the two or more groups, and an indication of the arrangement of the one or more segments along the one or more lines of the two or more groups within the secondary surface; and
      providing, to the composition processor, for each of at the segment along the one or more lines of the two or more groups traversing the secondary surface, the identification of the input surface that is to contribute to the secondary surface at the segment along the one or more lines of the two or more groups, and the indication of the arrangement of the one or more segments along the one or more lines of the group within the secondary surface.

* * * * *